United States Patent
Tomii

(10) Patent No.: US 10,474,082 B2
(45) Date of Patent: Nov. 12, 2019

(54) IMAGE FORMING APPARATUS AND METHOD FOR CONTROLLING IMAGE FORMING APPARATUS

(71) Applicant: CANON KABUSHIKI KAISHA, Tokyo (JP)

(72) Inventor: Hiroshi Tomii, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/892,927

(22) Filed: Feb. 9, 2018

(65) Prior Publication Data

US 2018/0239290 A1 Aug. 23, 2018

(30) Foreign Application Priority Data

Feb. 17, 2017 (JP) ................................ 2017-027791

(51) Int. Cl.
  *G03G 15/00* (2006.01)
  *G06T 7/00* (2017.01)
  *H04N 1/60* (2006.01)

(52) U.S. Cl.
  CPC ......... *G03G 15/55* (2013.01); *G03G 15/5062* (2013.01); *G06T 7/0002* (2013.01); *G03G 2215/00067* (2013.01); *G06T 2207/30168* (2013.01); *H04N 1/6041* (2013.01)

(58) Field of Classification Search
  CPC .. G03G 15/55; G03G 15/553; G03G 15/5062; G03G 2215/00067; G06T 7/0002; G06T 2207/30168
  See application file for complete search history.

(56) References Cited

U.S. PATENT DOCUMENTS

| 7,382,988 B2 | 6/2008 | Nakazato |
| 8,190,039 B2 | 5/2012 | Iida et al. |
| 2005/0099446 A1* | 5/2005 | Mizes ............... B41J 29/393 347/19 |

(Continued)

FOREIGN PATENT DOCUMENTS

| JP | 2005-128414 A | 5/2005 |
| JP | 2009-042691 A | 2/2009 |
| JP | 2009-063810 A | 3/2009 |

OTHER PUBLICATIONS

U.S. Appl. No. 15/798,930, Hiroshi Tomii Taichi Takemura Nobuhiko Zaima, filed Oct. 31, 2017.

*Primary Examiner* — Carla J Therrien
(74) *Attorney, Agent, or Firm* — Venable LLP

(57) ABSTRACT

An image forming apparatus includes a photosensitive member, a charging unit, an exposure unit, a developing unit, a transfer unit, and a controller configured to control the photosensitive member, the charging unit, the exposure unit, the developing unit, and the transfer unit to form a measurement image on the sheet, and acquire read data on the measurement image output from a reading device. The measurement image includes a first measurement image and a second measurement image. The controller forms the first measurement image based on a first image signal value and forms the second measurement image based on a second image signal value different from the first image signal value. The controller detects a streak included in the first measurement image or the second measurement image and determines an error based on a detection result.

20 Claims, 18 Drawing Sheets

(56) References Cited

U.S. PATENT DOCUMENTS

| | | | | |
|---|---|---|---|---|
| 2015/0110505 A1* | 4/2015 | Takahashi | ............ | G03G 15/55 399/15 |
| 2015/0192884 A1* | 7/2015 | Sone | ............ | G03G 15/50 399/49 |
| 2017/0219979 A1* | 8/2017 | Arimoto | ............ | G03G 15/01 |
| 2017/0308017 A1* | 10/2017 | Tomii | ............ | G03G 15/5058 |
| 2019/0129342 A1* | 5/2019 | Ikeda | ............ | G03G 15/5062 |

* cited by examiner

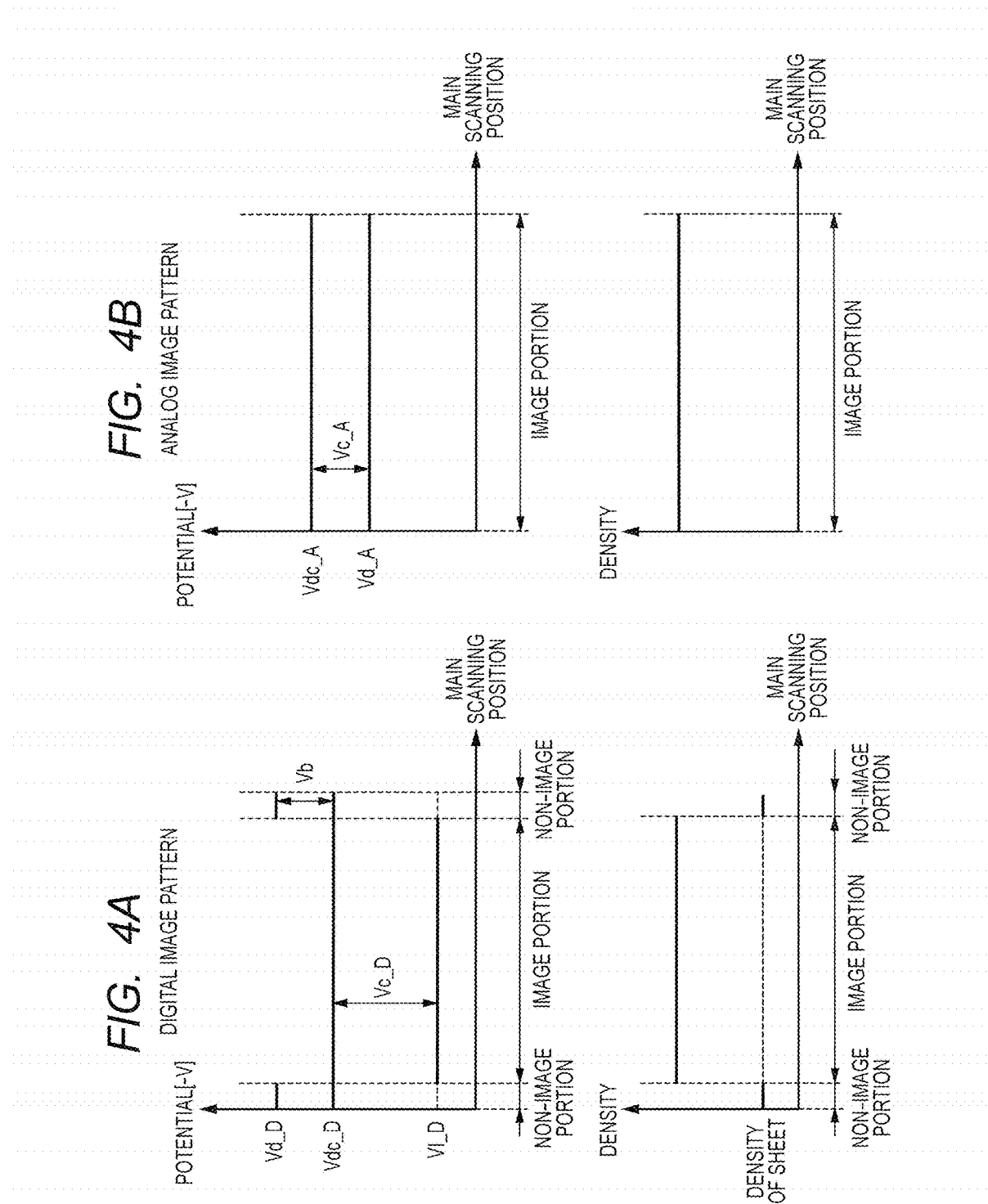

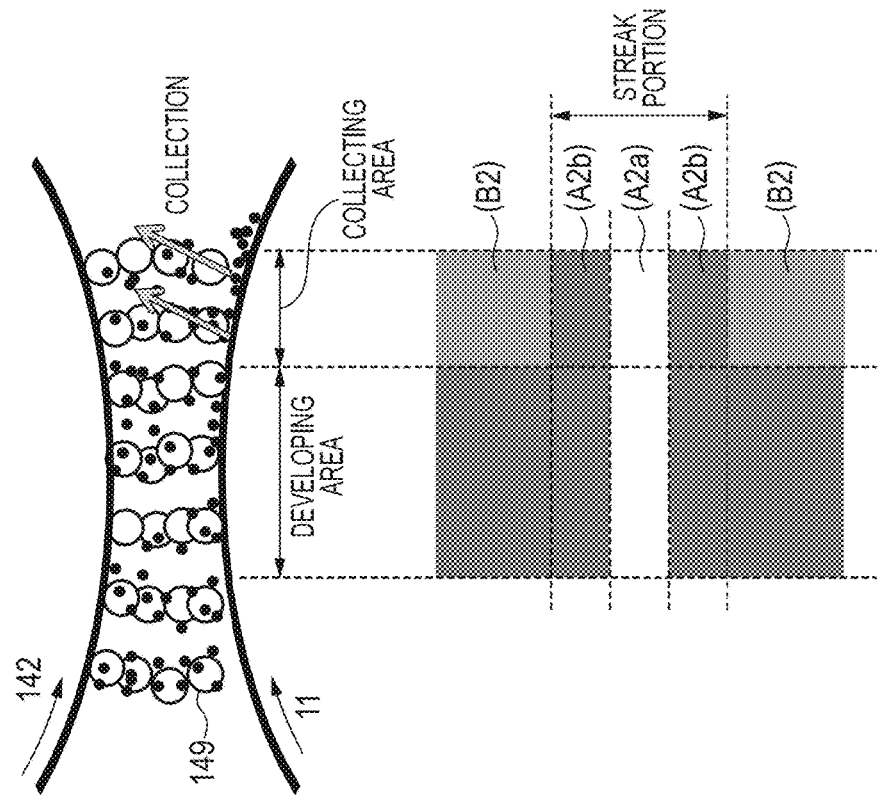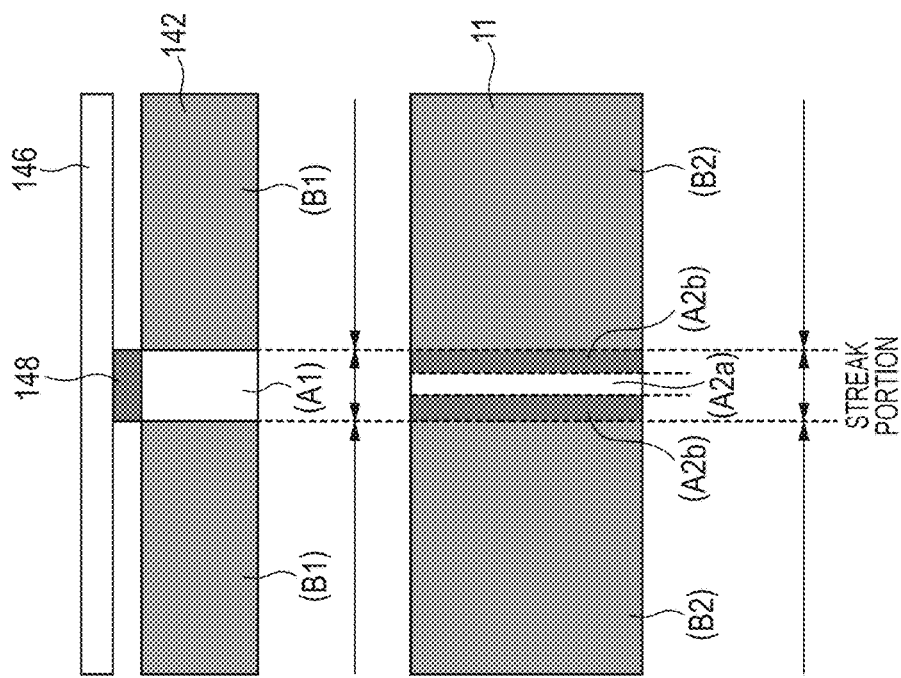

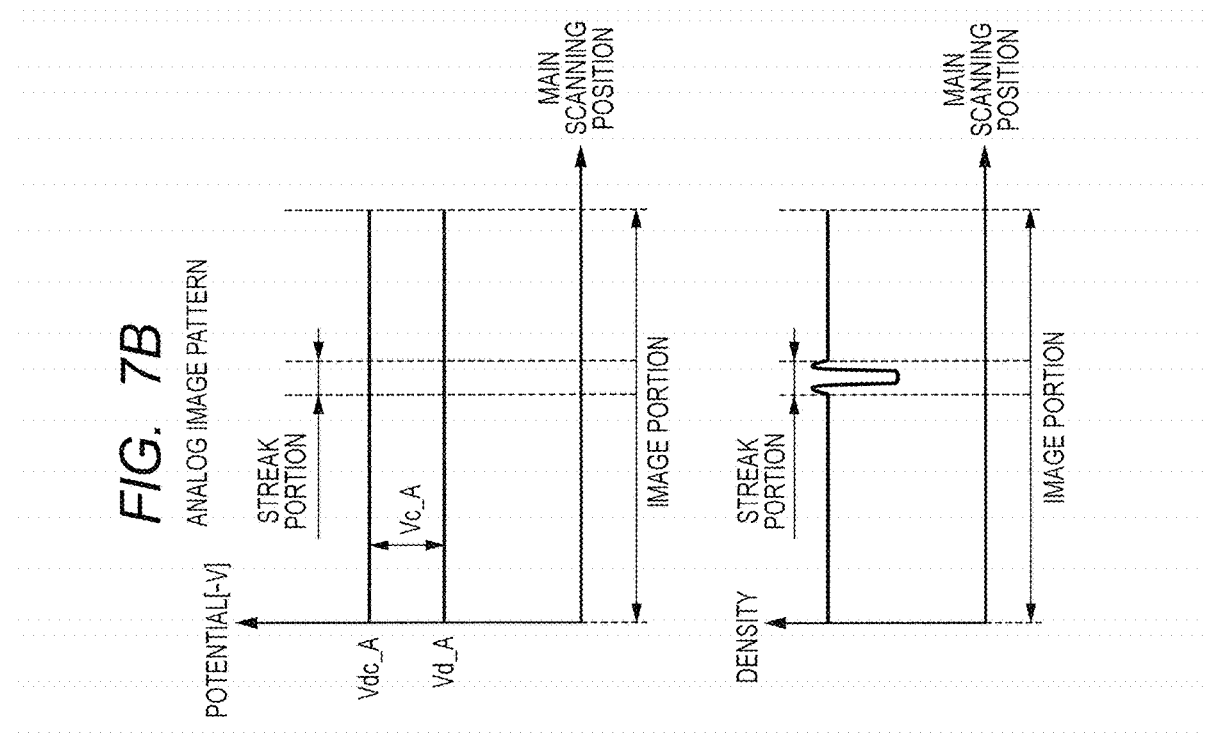
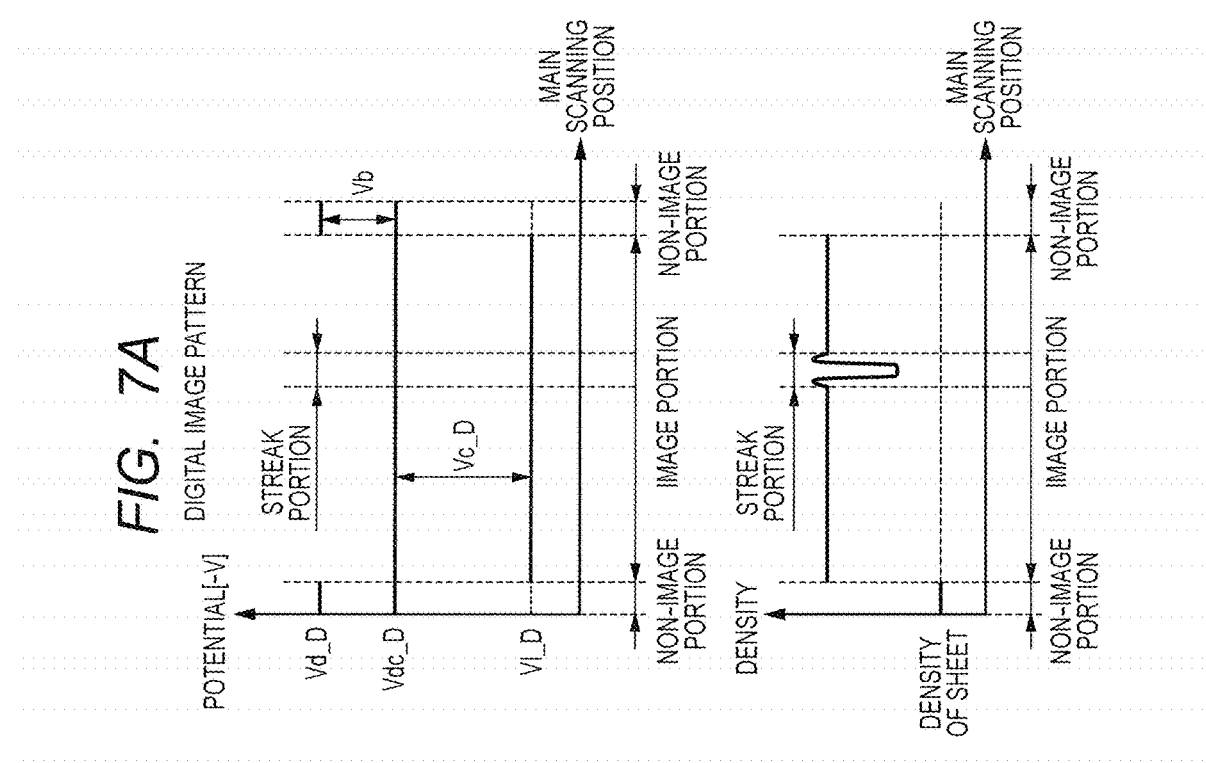

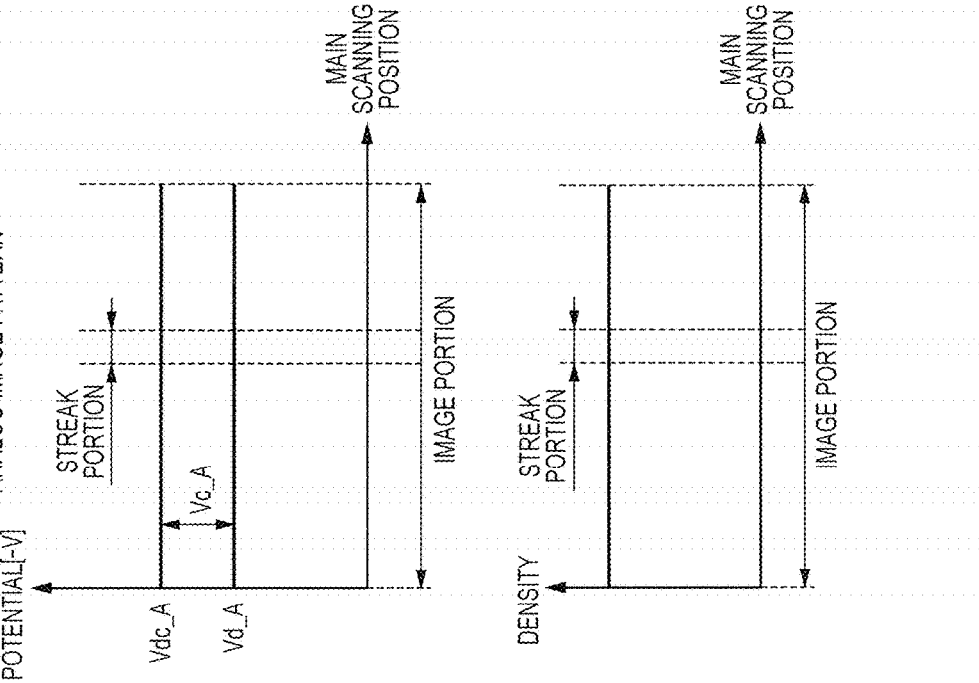
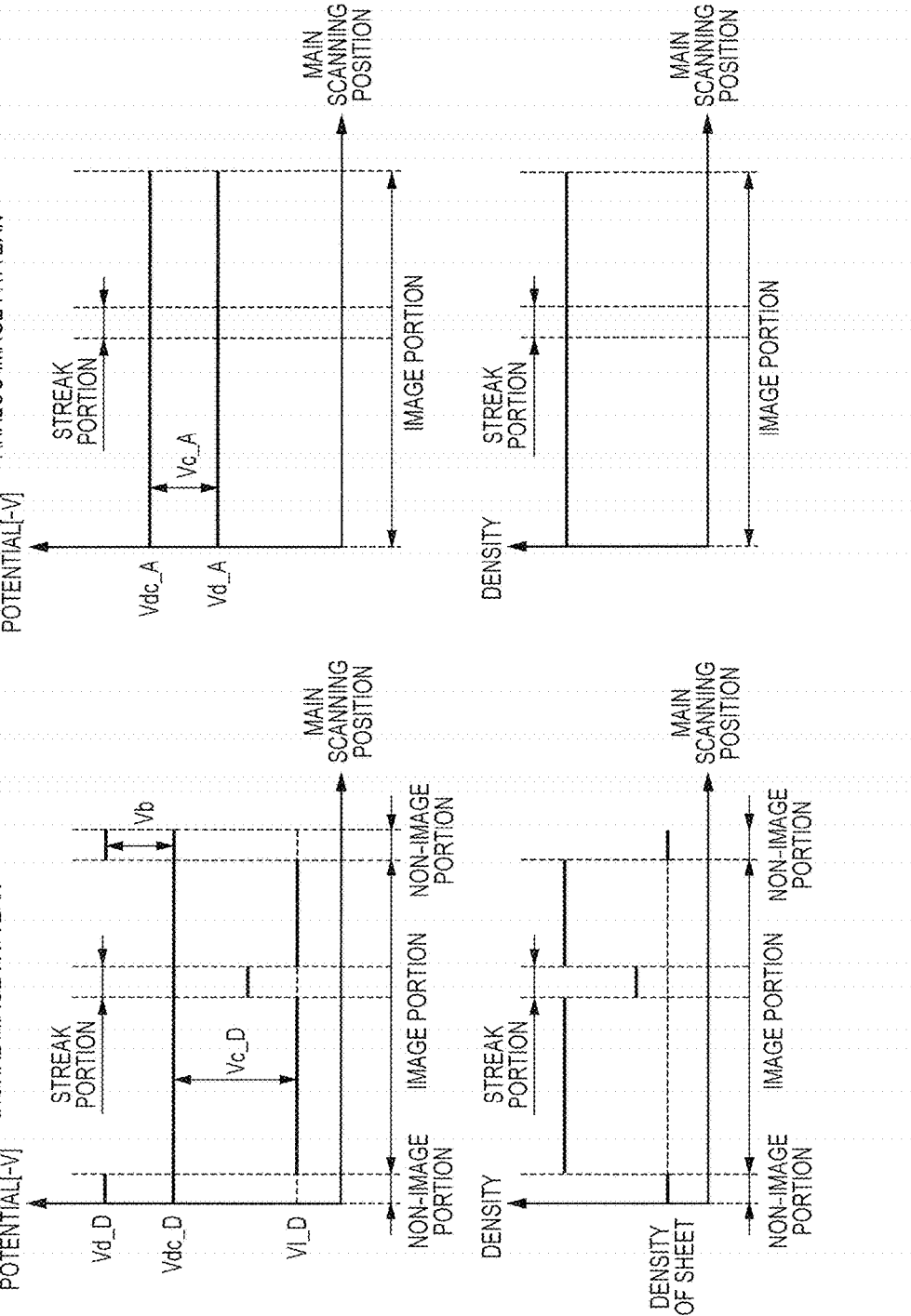

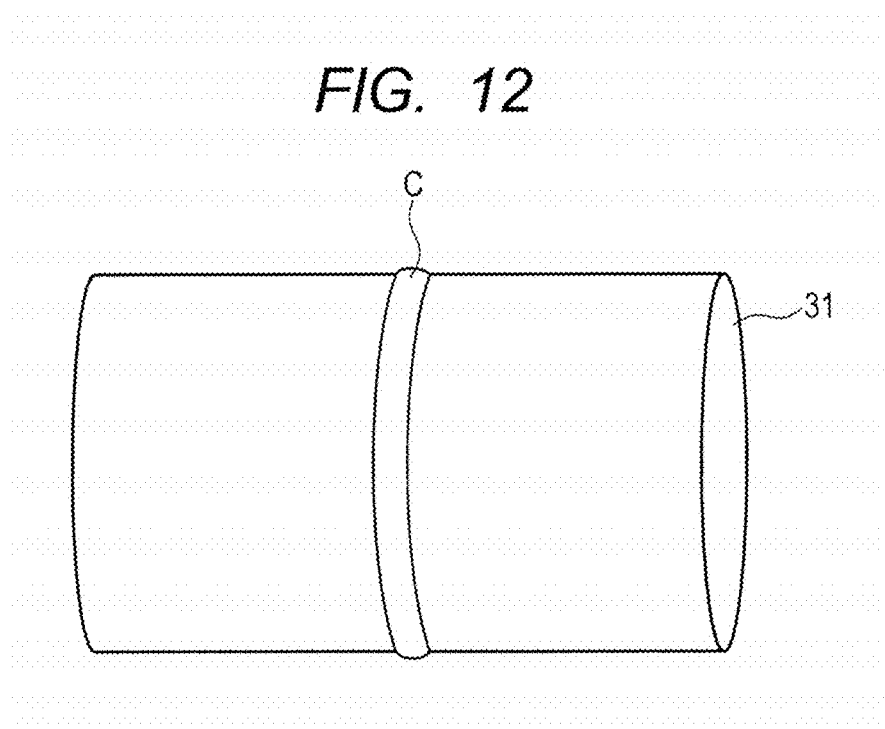

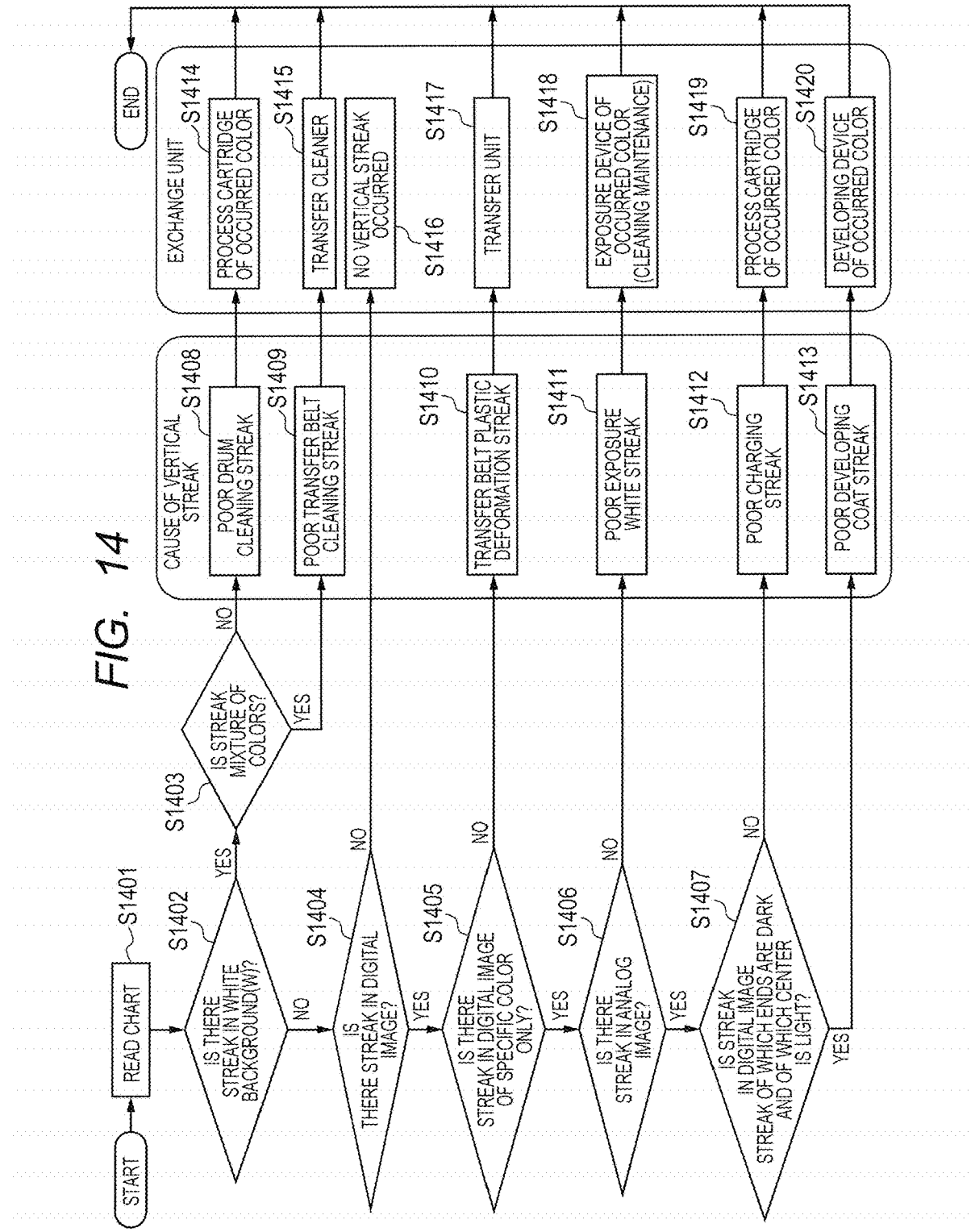

US 10,474,082 B2

IMAGE FORMING APPARATUS AND METHOD FOR CONTROLLING IMAGE FORMING APPARATUS

BACKGROUND OF THE INVENTION

Field of the Invention

The present invention relates to an image forming apparatus and a method for controlling an image forming apparatus.

Description of the Related Art

As to an image forming apparatus that utilizes electrophotography, such as a copying machine and printer, a technique for configuring some parts of an image forming apparatus in a form of an exchange unit being replaceable has been known (Japanese Patent Application Laid-Open No. 2005-128414). A typical exchange unit is a process unit into which one of a charging unit, developing unit, and cleaning portion, and a photosensitive member are integrated. Another such exchange unit is a process unit into which imaging units including a photosensitive member, developing unit, and charging unit are all integrated.

Making an exchange unit replaceable for an image forming apparatus allows a user and a serviceman to perform maintenance of the image forming apparatus easily. That is, by configuring some parts of the image forming apparatus in a form of an exchange unit, the maintenance can be completed only by replacing parts in need of maintenance on a unit basis, and such maintenance offers greater convenience to the user and the serviceman.

It is, however, often the case that a user or a serviceman cannot determine what exchange unit should be replaced, while being aware that an output image has an abnormality. For example, in a case of a white streak present in an output image, whether an abnormality lies in a state of a developing unit or a state of exposure due to an exposure unit with hair or another foreign matter adhered thereto cannot be determined.

As a result, a long time is taken in maintenance of an image forming apparatus to identify a part with an abnormality, causing a long downtime during which the image forming apparatus cannot operate.

Moreover, there are cases where even a part without abnormality is replaced by a user or a serviceman who cannot identify a part with an abnormality accurately, resulting in an increase in maintenance cost.

One of abnormalities occurring in an image is a streak image occurring in a conveyance direction of a recording material (hereafter, will be referred to as a vertical streak). Causes of occurrence of the vertical streak well-known among persons of the same profession include dirt on an exposure unit, unevenness coat of developer in a developing unit, and poor charging of a charging unit.

For such problems, Japanese Patent Application Laid-Open No. 2009-42691 proposes an image forming apparatus in which an identifying unit identifies an exchange unit to be replaced to solve an abnormality occurring in the apparatus. Based on an identification result by the identifying unit, an informing unit informs information on a unit to be replaced.

Specifically, a filled-in toner image for image determination is formed on a transfer belt, which is an image carrying body, and a density of the image is detected with a CCD arranged in a longitudinal direction. The read density of the filled-in image is then analyzed by a controller for identification of a process unit with an abnormality. Based on an identification result by the controller, the information on the exchange unit to be replaced is informed to a liquid crystal panel being the informing unit. At this point, when the controller determines that there is no exchange unit to be replaced, the determination is informed to the liquid crystal panel.

Japanese Patent Application Laid-Open No. 2009-63810 proposes an image forming apparatus that forms test images in presence and absence of exposure, so as to determine whether an exposure unit or a charging unit causes a poor image.

A configuration described in Japanese Patent Application Laid-Open No. 2009-42691 allows for identifying whether a yellow station, a magenta station, a cyan station, or a black station is to be the exchange unit.

The configuration, however, does not allow for sufficient identification to the extent of identifying which of an exposure unit, a charging unit, and a developing unit should be replaced or subjected to maintenance work.

A configuration described in Japanese Patent Application Laid-Open No. 2009-63810 identifies whether an exposure unit causes a streak using an image in absence of exposure (hereafter, analog image) and an image in presence of exposure (hereafter, digital image). Specifically, the exposure unit is identified to cause the streak when the streak is present in the digital image and not present in the analog image.

The configuration, however, involves a problem of being unable to identify which of the charging unit and the developing unit causes the streak when the streak is present both in the digital image and the analog image.

SUMMARY OF THE INVENTION

The present invention is made to solve the above problems and to provide a scheme that allows to make a diagnosis as to which of a charging unit and a developing unit causes a streak image by reading an image on a sheet on which the image developed in absence of exposure is printed and a sheet on which the image developed in presence of exposure is printed.

According to an embodiment of the present invention, an image forming apparatus, comprises:

a photosensitive member;

a charging unit configured to charge the photosensitive member;

an exposure unit configured to expose the photosensitive member charged by the charging unit based on image data to form an electrostatic latent image on the photosensitive member;

a developing unit configured to develop the electrostatic latent image on the photosensitive member using developer to form an image;

a transfer unit configured to transfer the image on the photosensitive member onto a sheet; and a controller configured to control the photosensitive member, the charging unit, the exposure unit, the developing unit, and the transfer unit to form a measurement image on the sheet, and configured to acquire read data on the measurement image output from a reading device, wherein the measurement image includes a first measurement image and a second measurement image, wherein the controller forms the first measurement image based on a first image signal value and forms the second measurement image based on a second image signal value different from the first image signal value, and wherein the controller detects a streak included in the first measurement image or the second measurement image and determines an error based on a detection result.

Further features of the present invention will become apparent from the following description of exemplary embodiments with reference to the attached drawings.

BRIEF DESCRIPTION OF THE DRAWINGS

FIG. 4A is a characteristic diagram illustrating a method for forming an image of digital image patterns.

FIG. 4B is a characteristic diagram illustrating a method for forming an image of analog image patterns.

FIG. 6A and FIG. 6B are schematic diagrams used for describing a streak image developed and formed in a photosensitive member.

FIG. 7A and FIG. 7B are diagrams illustrating a state of poor developing coat on a development sleeve.

FIG. 9A and FIG. 9B are characteristic diagrams illustrating a correlation between a poor exposure white streak and an exposure light quantity.

FIG. 12 is a diagram used for describing plastic deformation in a projecting shape occurring on an intermediate transfer belt.

FIG. 14 is a flowchart used for describing an image quality problem determination process in a first embodiment.

DESCRIPTION OF THE EMBODIMENTS

Preferred embodiments of the present invention will now be described in detail in accordance with the accompanying drawings.

Description of System Configuration

First Embodiment

[Image Forming Apparatus]

Figure 1:
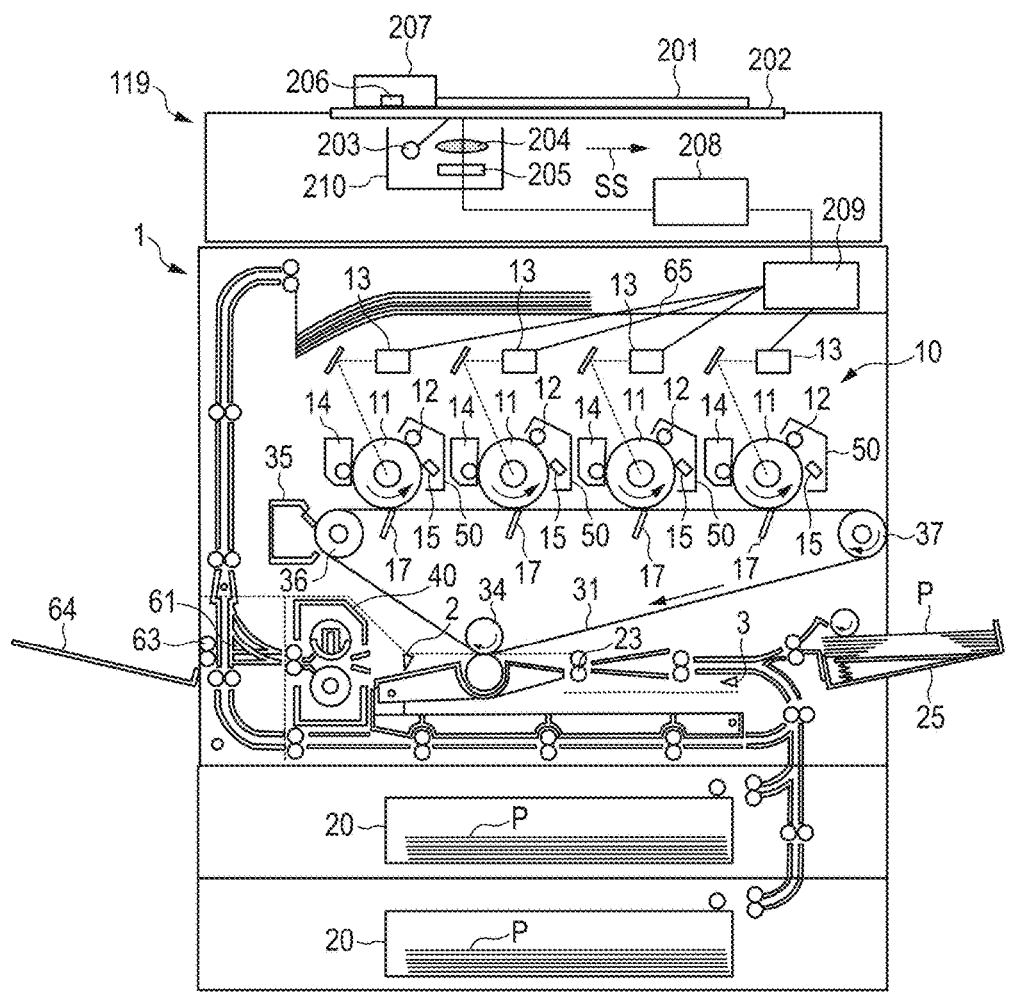
FIG. 1 is a cross-sectional view illustrating an image forming apparatus.

FIG. 1 is a cross-sectional view illustrating an image forming apparatus 1 according to the present embodiment.

Description will be made first on a scanner 119 that is a reading unit. In FIG. 1, sensors 2, 3 are configured to monitor a conveyance state of a recording material (sheet) P being conveyed. A flapper 61 is adapted to control a conveyance direction of the recording material P to discharge the recording material P to one of discharge trays 64, 65. A discharge roller 63 is adapted to discharge the recording material P to the discharge tray 64.

An original 201 placed on an original glass plate 202 is illuminated by a light source 203. Reflected light from the original 201 passes through an optical system 204 and forms an image on a CCD sensor 205. The CCD sensor 205 includes red, green, and blue CCD line sensors, which are arranged in three rows and configured to generate red, green, and blue color component signals, respectively. A reading optical system unit 210 is configured to perform a scan in a sub-scanning direction illustrated by an arrow SS, so as to convert an image signal from the original 201 into an electric signal data stream for each line of the original 201.

On the original glass plate 202, a bumping member 207 is disposed, against which an edge of the original 201 is caused to bump to be prevented from being put obliquely. In addition, on a surface of the original glass plate 202, a reference white board 206 is disposed for determining a white level of the CCD sensor 205 and performing shading in a thrust direction of the CCD sensor 205. An image signal obtained from the CCD sensor 205 is subjected to image processing by a read image processing portion 208 and thereafter delivered to the image forming apparatus 1 to be subjected to image processing by a printer controlling portion 209.

Next, the image forming apparatus 1 will be described. An image forming portion 10 according to the present embodiment employs a scheme in which a toner image formed on photosensitive drums 11 is transferred onto a recording material P and thereafter the image is fixed to the recording material P by a fixing device 40.

The image forming portion 10 includes an image forming portion that is configured to form toner images of colors including Y (yellow), M (magenta), C (cyan), and Bk (black). The image forming portion 10 includes four photosensitive drums 11 corresponding to the respective colors Y, M, C, Bk, in order from a left side of FIG. 1. On a periphery of each of the photosensitive drums 11, a roller-shaped charger 12 serving as a charging unit, an exposure device 13 serving as an exposure unit, a developing device 14 serving as a developing unit, a primary transfer blade 17, and a drum cleaner 15 are disposed.

The photosensitive drums 11 used in the present embodiment each have an outer diameter of 30 mm and an outer circumference of about 94.2 mm. Description will be made below about a procedure to form a toner image of the Bk color, and the description holds true for procedures for forming toner images of other colors. The photosensitive drums 11 each serving as an electrophotographic photosensitive member are each configured to be rotated by a driving source (not illustrated), in a direction indicated by an arrow.

Next, a procedure until forming a toner image on a recording material P will be described. A surface of a photosensitive drum 11 is uniformly charged by the charger 12, and thereafter exposed to laser light modulated according to image information by the exposure device 13, so that an electrostatic latent image is formed. The electrostatic latent image is then developed with toner by the developing device 14, so that the toner image is formed on the photosensitive drum 11.

The color toner image on the photosensitive drum 11 for the Bk color is subjected to primary transfer onto an intermediate transfer belt 31 by the primary transfer blade 17, and toner residing on the photosensitive drum 11 of the Bk color is removed by the drum cleaner 15. In such a manner, the photosensitive drum 11 of the Bk color becomes ready for the next image formation.

Meanwhile, recording materials P stacked on one of feeding cassettes 20 or a multiple feeding tray 25 are one by one fed out and fed into a registration roller pair 23 by a feeding mechanism. The registration roller pair 23 once stops the recording material P and makes an orientation of the recording material P move straight to a conveyance direction when the recording material P moves obliquely. The recording paper P is then fed into between the intermediate transfer belt 31 and a secondary transfer roller 34 in synchronization with a toner image on the intermediate transfer belt 31.

The secondary transfer roller 34 is configured to transfer the toner image on the intermediate transfer belt 31 onto the recording material P. Toner residing on the intermediate transfer belt 31 is removed by a transfer cleaner 35, and the intermediate transfer belt 31 thereby becomes ready for the next image formation. The recording material P onto which the toner image is transferred is conveyed to the fixing device 40, where the toner image is heated and pressurized, so that the toner image permanently fixed to the recording material P is formed.

In the present embodiment, the photosensitive drum 11, the charger 12, and the drum cleaner 15 are held in a process cartridge 50. The process cartridge 50 can be easily attached to and detached from the image forming apparatus 1.

Therefore, the photosensitive drum 11, the charger 12, and the drum cleaner 15 can be replaced at a time by replacing only the process cartridge 50. This configuration allows a user and a serviceman to reduce complicatedness of maintenance of the apparatus and to shorten a maintenance time. In the present embodiment, the developing device 14 can be easily attached to and detached from the image forming apparatus 1.

In addition, in the present embodiment, at least the primary transfer blade 17 and the intermediate transfer belt 31 are held in a transfer unit. The transfer unit can be easily attached to and detached from the image forming apparatus 1. Therefore, the primary transfer blade 17 and the intermediate transfer belt 31 can be replaced at a time by replacing only the transfer unit, and this configuration allows a user and a serviceman to reduce complicatedness of maintenance of the apparatus and to shorten a maintenance time.

In the image forming apparatus 1 according to the present embodiment, the transfer cleaner 35 can be easily attached to and detached from the image forming apparatus 1. In addition, a developer used in the present embodiment is a two-component developer made of a non-magnetic toner and a low-magnetic-susceptibility high-resistivity carrier.

The non-magnetic toner is made by using a binder resin such as a styrene-based resin and a polyester resin, a colorant such as a carbon black, a dye, and a pigment, a releasing agent such as a wax, a charge control agent, and other agent, in proper amounts. Such a non-magnetic toner can be produced by processes such as a grinding process and a polymerization process.

As the magnetic carrier, use can be made of one that has been known. For example, use can be made of a resin carrier that is made by dispersing magnetite in a resin as a magnetic material and dispersing carbon black for making the resin carrier conductive and adjusting a resistance of the resin carrier. Alternatively, use is made of a magnetic carrier made of a single magnetite such as ferrite a surface of which is subjected to oxidation and reduction treatment for resistance adjustment. Use is also made of a magnetic carrier made of a single magnetite such as ferrite a surface of which is coated with resin for resistance adjustment.

[System Configuration of Image Forming Apparatus]

Figure 2:
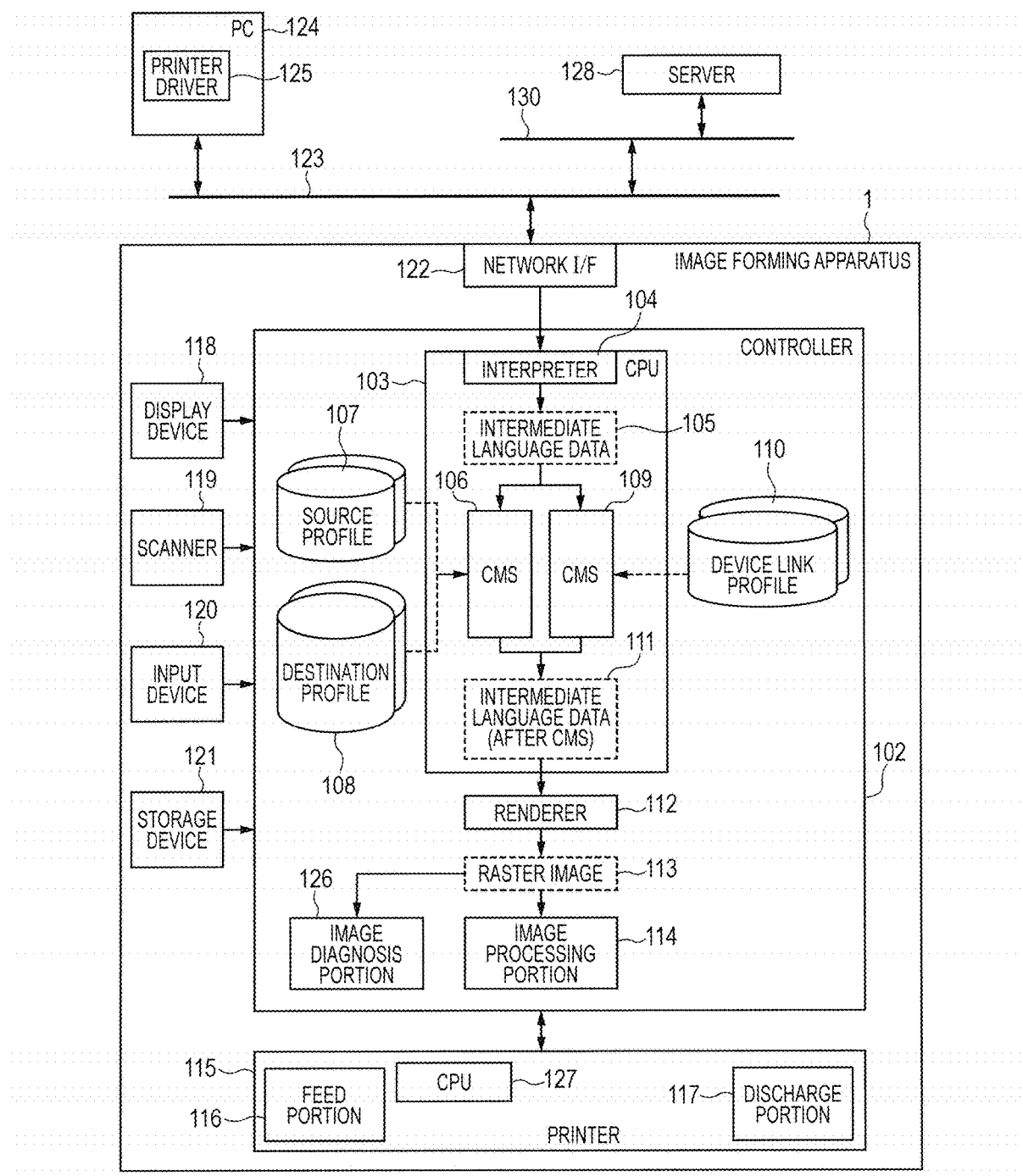
FIG. 2 is a diagram illustrating a configuration of a system including the image forming apparatus.

FIG. 2 is a diagram illustrating a configuration of a system including the image forming apparatus 1 representing the present embodiment. In FIG. 2, the image forming apparatus 1 is communicatively connected to other network-aware devices over a network 123. A personal computer (hereafter, abbreviated as a PC) 124 is connected to the image forming apparatus 1 over the network 123. In the PC 124, a printer driver 125 is configured to transmit print data to the image forming apparatus 1.

A network interface (hereafter, referred to as a network IF) 122 is configured to receive print data or other types of data. A controller 102 serving as the printer controlling portion 209 is made up of a CPU 103, a renderer 112 and an image processing portion 114. An interpreter 104 of the CPU 103 is configured to interpret a PDL (page description language) portion of received print data to generate intermediate language data 105.

In a color management system (hereafter, abbreviated as CMS) 106 performs color conversion with a source profile 107 and a destination profile 108 to generate intermediate language data (post-CMS) 111. Here, the CMS 106 performs the color conversion using information on a profile to be described later. A source profile 107 is a profile used for conversion from a device-dependent color space such as RGB and CMYK to a device-independent color space such as L*a*b* (hereafter, abbreviated as Lab) and XYZ defined by the CIE (Commission Internationale de l'Eclairage).

The XYZ is a device-independent color space as with Lab, representing a color using tristimulus values.

A destination profile 108 is a profile used for conversion from a device-independent color space to a CMYK color space dependent of the image forming apparatus 1.

Meanwhile, a CMS 109 performs color conversion with a device link profile 110 to generate intermediate language data (post-CMS) 111. Here, the device link profile 110 is a profile used for direct conversion from a device-dependent color space such as RGB and CMYK to a CMYK color space dependent of the image forming apparatus 1. A selection from the CMSs 106, 109 depends on a setting made in the printer driver 125.

The renderer 112 is configured to generate a raster image 113 from the generated intermediate language data (post-CMS) 111. The image processing portion 114 is configured to perform image processing on the raster image 113 or image data read by a scanner 119. The image processing portion 114 will be described later in detail.

A displaying device 118 is a UI (user interface) configured to display instructions to a user and a state of the image forming apparatus 1. The displaying device 118 is used for copy processing, transmission processing, and other types of processing, as well as image diagnosis processing to be described later. An input device 120 is an interface configured to accept an input from a user. Parts of the input device are integrated into the displaying device 118 in a form of a touch panel. A storage device 121 stores data processed by the controller 102, data received by the controller 102, and other types of data. An image diagnosis portion 126 is configured to output a chart and carry out analysis processing to perform image diagnosis processing when an image quality problem occurs. The image diagnosis processing will be described later in detail.

A server 128 is communicatively connected to the image forming apparatus 1 over a network 130. The network 130 is connected to the network 123 and supposed to be in a remote environment such as an exterior building. Although being connected only to the image forming apparatus 1 in the present embodiment, the server 128 is supposed to manage information on a plurality of image forming apparatuses.

A printer 115 includes a CPU 127. The CPU 127 is configured to control a feed portion 116 to feed a recording material P. The CPU 127 is configured also to control a discharge portion 117 to discharge a recording material P.

[Vertical Streak Image]

Next, description will be made about a phenomenon and a feature of a vertical streak occurring in portions of the image forming apparatus 1 of the present embodiment.

[First Poor Image Detection Chart]

Next, a first poor image detection chart will be described. The first poor image detection chart is a chart used for determination of a unit causing occurrence of a conveyance direction streak. A process until a user or a serviceman outputs the first poor image detection chart (hereafter, referred to as a vertical streak detection chart), a process of reading an output vertical streak detection chart by a reading unit, and a process of determining a failure part will be described later.

In the present embodiment, use is made of a sheet of an A3 size (297 mm in a width direction and 420 mm in a conveyance direction) as a recording material P for outputting the vertical streak detection chart, but the recording material P is not limited to the size. The vertical streak detection chart may be output in a plurality of sheets.

As to the vertical streak detection chart in the present embodiment, description will be made about one that includes image patterns formed in presence of exposure by the exposure device 13, and non-exposure image patterns formed by the charger 12 and the developing device 14 in absence of exposure by the exposure device 13. However, the vertical streak detection chart may include only digital image patterns. The image patterns referred to herein mean the digital image patterns. The non-exposure image patterns referred to herein mean the analog image patterns.

Figure 3:
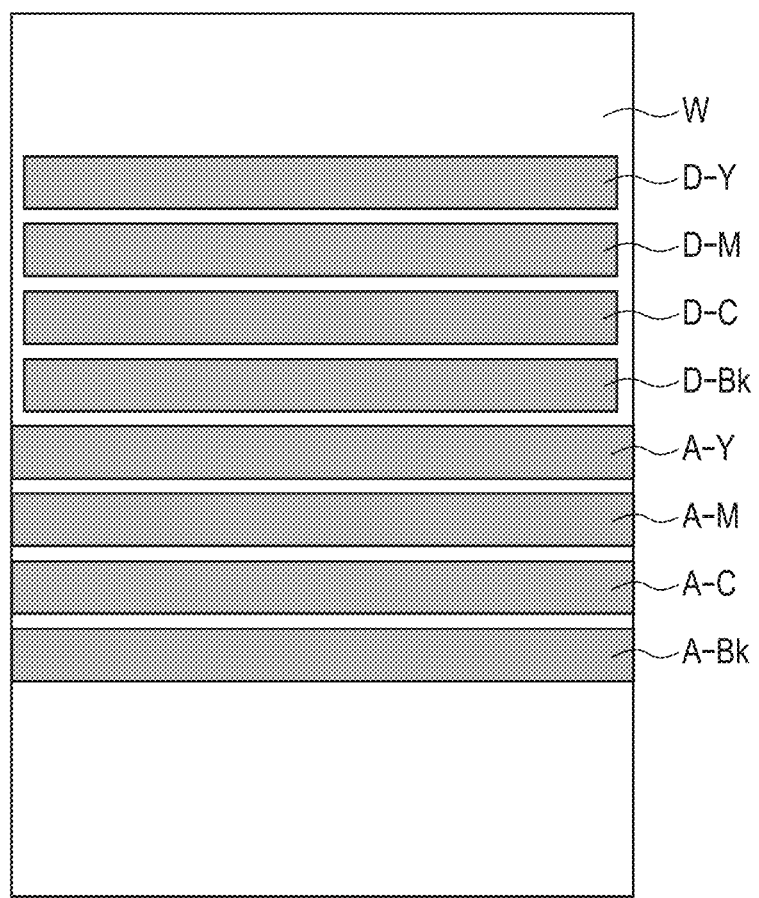
FIG. 3 is a diagram illustrating a first poor image detection chart.

The vertical streak detection chart in the present embodiment includes, as illustrated in FIG. 3, white background portions (W) not involved in forming image patterns. The vertical streak detection chart further includes digital image patterns (D-Y, D-M, D-C and D-Bk) formed from 50% signal values of colors of yellow (Y), magenta (M), cyan (C), and black (Bk). The vertical streak detection chart further includes analog image patterns (A-Y, A-M, A-C and A-Bk).

Description will be made also about sizes of the image patterns of the respective colors in the vertical streak detection chart in the present embodiment. The image patterns are each set to have a length in the conveyance direction of about 30 mm. Having a length of about 30 mm or longer allows detection of a conveyance direction streak. The digital image patterns are each set to have a width in a main-scanning direction equal to an entire width of an image formable region, so that margins are formed. Meanwhile, the analog image patterns are each set to have a width in the main-scanning direction equal to an entire width of a sheet including ends of the sheet, so that margins are not formed.

FIG. 4A and FIG. 4B are characteristic diagrams respectively illustrating methods for forming a digital image pattern and an analog image pattern in the image forming apparatus representing the present embodiment. Vertical axes represent charged potential [−V], and horizontal axes represent position in the main-scanning direction.

As illustrated in FIG. 4A, in forming the digital image pattern, the photosensitive drum 11 is uniformly charged by the charger 12 to have a charged potential (Vd_D), and when a portion on the photosensitive drum 11 to be subjected to toner development is irradiated with laser light by the exposure device 13, a potential of the portion of the photosensitive drum 11 becomes a post-exposure potential (Vl_D). A DC potential (Vdc_D) of a development bias potential to be applied to a developing sleeve 142 is set as appropriate between the charged potential and the post-exposure potential. With this, a fog removal voltage (Vb) is formed between the charged potential (Vd_D) of the non-exposed portions and the DC potential (Vdc_D) so that toner is not developed in the non-exposed portions on the photosensitive drum 11, and a development voltage (Vc_D) is formed between the post-exposure potential (Vl_D) of the exposed portions and the DC potential (Vdc_D) so that toner is developed in the exposed portions on the photosensitive drum 11. For that reason, in the digital image pattern, margins (non-image portions) can be formed in ends of a sheet by not being exposed.

In the present embodiment, in a digital image pattern portion, an image pattern of a 50% image signal value is formed by halftone processing. A density of each color for the 50% signal value is 0.6 in the present embodiment. A reason for using halftone patterns of the 50% signal value is that halftones generally have an advantage in detecting a conveyance direction streak over solid fills.

As illustrated in FIG. 4B, in forming the analog image pattern, the photosensitive drum 11 is uniformly charged by the charger 12 to have a charged potential (Vd_A) but is not irradiated with laser light by the exposure device 13. At this point, a DC potential of a development bias (Vdc_A) higher than the charged potential (Vd_A) is applied to the developing sleeve 142. This application forms a development voltage (Vc_A) between the photosensitive drum 11 and the developing sleeve 142, and toner is developed on the photosensitive drum 11.

The development voltage (Vc_A) is constant irrespective of a main scanning position since exposure is not used for the analog image pattern. An image is therefore formed up to ends of a sheet, and margins are not formed. In addition, since exposure is not used, halftone processing cannot be performed. In the present embodiment, the development voltage (Vc_A) is adjusted so that a density of each color of the analog image pattern becomes 0.6.

In general, irrespective of whether an image pattern is a digital image or an analog image, an AC component is superposed on a DC component of each of the charged potential and the development bias so that the DC potential becomes uniform within the image pattern.

In a case of using a non-contact charging system, an analog image pattern can be formed by changing an amount of current to flow through a metal wire to adjust the charged potential of the photosensitive drum 11.

[Conveyance Direction Streak Image]

Next, description will be made about a phenomenon and a feature of a conveyance direction streak occurring in portions of the image forming apparatus 1 of the present embodiment, the conveyance direction streak being one of the types of poor images.

TABLE 1

| TYPE OF CONVEYANCE DIRECTION STREAK | EXCHANGE UNIT | WHITE BACKGROUND (W) | COLOR OF IMAGE PATTERN WHERE STREAK OCCURS | DIGITAL IMAGE PATTERN | ANALOG IMAGE PATTERN | FEATURE OF STREAK |
|---|---|---|---|---|---|---|
| POOR DEVELOPING COAT STREAK | DEVELOPING UNIT OF OCCURRING COLOR | NO STREAK | OCCURRING COLOR ONLY | STREAK OCCURRENCE | STREAK OCCURRENCE | STREAK OF WHICH ENDS ARE DARK AND OF WHICH CENTER IS LIGHT |
| POOR EXPOSURE WHITE STREAK | EXPOSURE DEVICE OF OCCURRING COLOR (CLEANING MAINTENANCE) | NO STREAK | OCCURRING COLOR ONLY | STREAK OCCURRENCE | NO STREAK | LIGHT STREAK |
| POOR CHARGING STREAK | PROCESS CARTRIDGE OF OCCURRING COLOR | NO STREAK | OCCURRING COLOR ONLY | STREAK OCCURRENCE | STREAK OCCURRENCE | DARK STREAK OR LIGHT STREAK |
| TRANSFER BELT PLASTIC DEFORMATION STREAK | INTERMEDIATE TRANSFER UNIT | NO STREAK | ALL COLORS | STREAK OCCURRENCE | STREAK OCCURRENCE | DARK STREAK OR LIGHT STREAK |
| POOR DRUM CLEANING STREAK | PROCESS CARTRIDGE OF OCCURRING COLOR | STREAK OCCURRENCE (SINGLE COLOR) | ALL COLORS | STREAK OCCURRENCE | STREAK OCCURRENCE | DARK STREAK |
| POOR TRANSFER BELT CLEANING STREAK | TRANSFER BELT CLEANER | STREAK OCCURRENCE (MIXTURE OF COLORS) | ALL COLORS | STREAK OCCURRENCE | STREAK OCCURRENCE | DARK STREAK |

Table 1 is a table used for describing features corresponding to types of conveyance direction streaks detected in the image forming apparatus of the present embodiment.

Table 1 shows units to be exchanged or actions to be taken corresponding to the conveyance direction streaks, states of a white background, and a feature of a color or colors of an image pattern where the streaks occur. Table 1 also shows presence/absence of a streak occurring in each of a digital image pattern and an analog image pattern, and a feature of a detected streak. In the present embodiment, a streak being light relative to a normal portion will be referred to as a white streak, and a streak being dark relative to a normal portion will be referred to as a black streak, in the following description.

[Poor Developing Coat Streak]

Figure 5A:
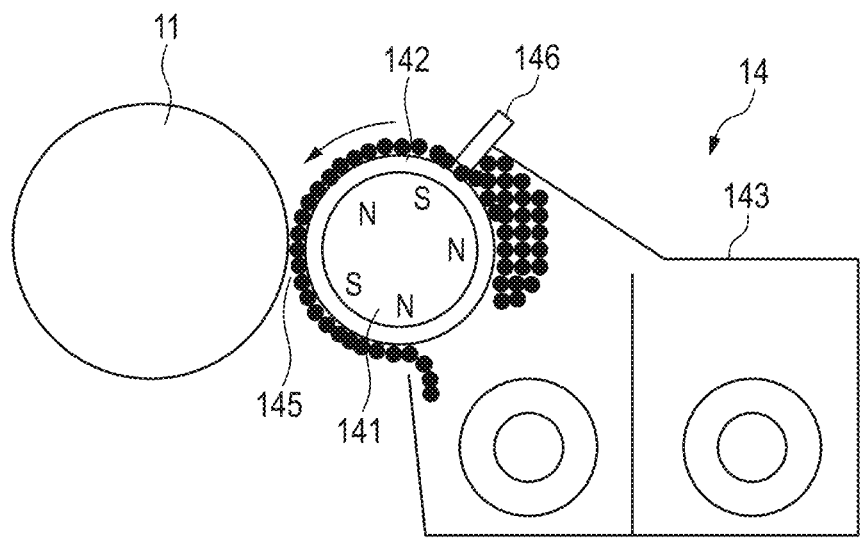
FIG. 5A and FIG. 5B are schematic diagrams used for describing development processing.
Figure 5B:
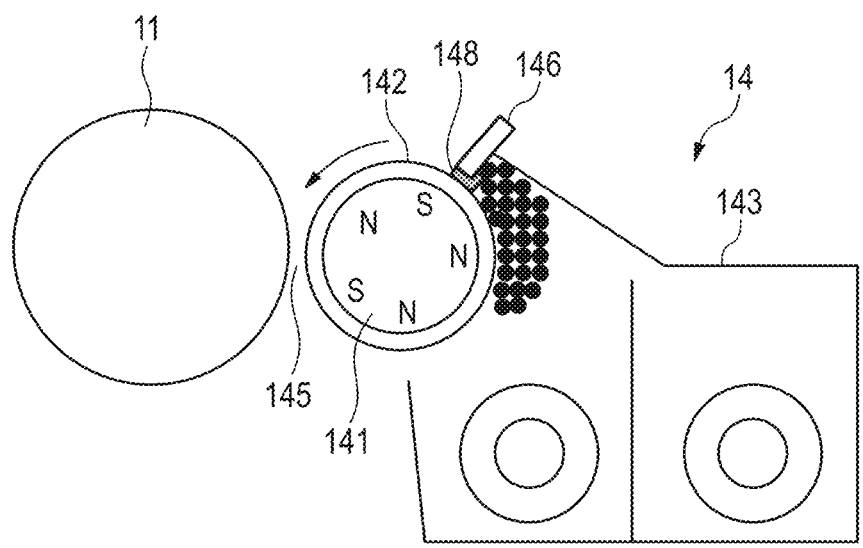

FIG. 5A and FIG. 5B are schematic diagrams used for describing development processing by the photosensitive drum 11 and the developing sleeve 142. Description will be made below about a feature of a case where a conveyance direction streak image is formed.

First, a first conveyance direction streak is a poor developing coat streak.

FIG. 5A illustrates a coat state on the developing sleeve 142 of the developing device as a cause of a poor developing coat streak occurring. The developing device 14 of the present embodiment includes therein a magnet 141 as a developer bearing member and includes the developing sleeve 142 that is supported by a developing container 143 in such a manner as to freely rotate.

The developing device 14 also includes a regulation blade 146 disposed on an upstream side of a nearest-neighbor portion 145 in a rotating direction of the developing sleeve 142 at predetermined intervals from the developing sleeve 142, the nearest-neighbor portion 145 being nearest from the photosensitive drum 11 in the developing device. The regulation blade 146 is adapted to regulate an amount of two-component developer to be supplied to the nearest-neighbor portion 145.

As a result, as illustrated in FIG. 5A, developer is borne on the developing sleeve 142 and uniformly borne on the developing sleeve 142 as illustrated by B1 portions in FIG. 6A. When a configuration of the developing device and a state of the developer are uniform, magnetic brushes 149 of the developer are uniformly formed on the developing sleeve 142, as illustrated in FIG. 6B. Here, on the developing sleeve 142, a density of the magnetic brushes 149 of the developer is not increased only in a vicinity of a foreign object 148.

However, when the foreign object 148 such as dust, hair, a plastic piece clogs between the developing sleeve 142 and the regulation blade 146 as illustrated in FIG. 5B, a flow of the developer is obstructed at a clogged portion. The obstruction causes a portion where no developer is borne on the developing sleeve 142 as illustrated by an A1 portion of FIG. 6A. The A1 portion has less magnetic brushes 149 of the developer than the B1 portions.

Next, in a developing area illustrated in FIG. 6B, the developer borne on the developing sleeve 142 is developed by toner being caused to fly from the developing sleeve 142 toward the photosensitive drum 11 by an electric field generated between the developing sleeve 142 and the photosensitive drum 11. The flying uses involvement of the magnetic brushes 149 of the developer.

At this point, by the flying the toner is developed not only in B2 areas of FIG. 6B but also in A2b areas on the photosensitive drum 11. Here, as to a range of an extent of the flying toner, a case where the development bias is formed only of the DC component is larger than a case where the development bias is formed by superposing the AC component on the DC component. In an A2a area of FIG. 6B, little amount of flying toner is developed on the photosensitive drum 11.

Next, in a collecting area illustrated in FIG. 6B, the toner developed on the photosensitive drum 11 touches the magnetic brushes 149 of the developer to be collected from the photosensitive drum 11. Here, in the B2 areas illustrated in FIG. 6B, presence of the magnetic brushes 149 of the developer causes the toner to be collected from the photosensitive drum 11.

Meanwhile, in the A2b areas, absence of the magnetic brushes 149 of the developer causes the toner not to be collected from the photosensitive drum 11. For that reason, the A2b areas being ends of a streak have a larger amount of toner developed on the photosensitive drum 11 than the B2 areas being normal portions, resulting in streaks darker than the normal portions.

The range of the extent of the flying toner is larger than a range of collection of the developer by the magnetic brushes 149. As a result, the A2a area being a central portion of the streak has a smaller amount of toner developed on the photosensitive drum 11 than A2b being the ends of the streak, resulting in being lighter than A2b.

Here, as to an amount of the toner developed on the photosensitive drum 11 and then touching the magnetic brushes 149 of the developer, the case where the development bias is formed only of the DC component is larger than the case where the development bias is formed by superposing the AC component on the DC component. Therefore, an amount of toner collected from the photosensitive drum 11 is increased.

The phenomenon of poor developing coat described above occurs not only in a case of the two-component developer, which is made of toner and carrier, but also in a case of a one-component developer, which is made only of toner. Of course, a unit to be exchanged in order to eliminate the poor developing coat streak is a developing device 14 of an occurring color.

[Poor Developing Coat White Streak]

A feature of a poor developing coat white streak will be described.

First, the poor developing coat white streak does not occur in a white background, where no image pattern is formed. An occurring color of the poor developing coat white streak is limited only to a color of a developing device where poor developing coat occurs.

As illustrated in FIG. 7A and FIG. 7B, the poor developing coat is caused by developer not borne on the developing sleeve 142. Therefore, a poor developing coat streak (streak portion) can be formed in both cases of a digital image pattern illustrated in FIG. 7A and an analog image pattern illustrated in FIG. 7B. In addition, a feature of the poor developing coat streak is that a density is high at ends of the photosensitive drum and low at the central portion, as illustrated with reference to FIG. 6A and FIG. 6B.

[Poor Exposure White Streak]

Next, a second conveyance direction streak is a poor exposure white streak.

Figure 8:
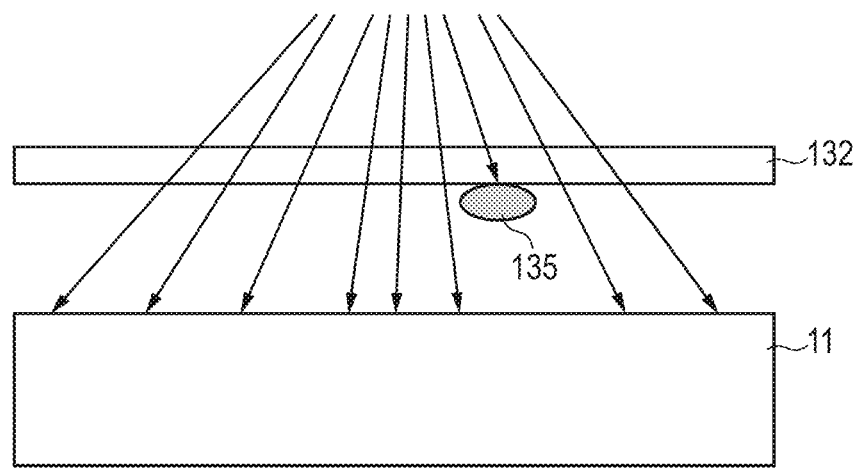
FIG. 8 is a diagram used for describing what causes a poor exposure white streak.

As illustrated in FIG. 8, a poor exposure white streak is caused by a foreign object 135 such as dust, hair, and toner adhering on a portion of a dust-proof glass 132 of the exposure device 13, in a longitudinal direction. The foreign object 135 cuts off laser light to be applied to a surface of the photosensitive drum 11, resulting in formation of a conveyance direction streak. That is, as described above, the image forming apparatus of the present embodiment has a configuration in which laser light is applied to a portion of the photosensitive drum 11 to perform toner development.

In this manner, when laser light to be applied on the surface of the photosensitive drum 11 is cut off, a quantity of exposure light decreases, and a potential of an electrostatic latent image to be formed is lowered. As a result, toner to be developed is reduced, resulting in occurrence of a white streak. Of course, in order to eliminate the poor exposure white streak, performing cleaning maintenance work on the dust-proof glass 132 or performing work to exchange the exposure device is needed.

A feature of the poor exposure white streak will be described below.

First, the poor exposure white streak does not occur in a white background, where no image pattern is formed. An occurring color of the poor exposure white streak is limited only to a color of an exposure device where poor exposure occurs. As illustrated in FIG. 9A and FIG. 9B, the poor exposure white streak is caused by a decrease in a quantity of exposure light.

In a case of a digital image pattern illustrated in FIG. 9A, the decrease in the quantity of exposure light increases a post-exposure potential (Vl_D) of the photosensitive drum 11 in some portion, where a white streak occurs.

Meanwhile, in a case of an analog image pattern illustrated in FIG. 9B, since the image pattern is formed without use of exposure, no streak occurs. As described above, the poor exposure white streak is limited only to a light streak.

[Poor Charging Streak]

Next, description will be made about a poor charging streak, a third conveyance direction streak.

Figure 10A:
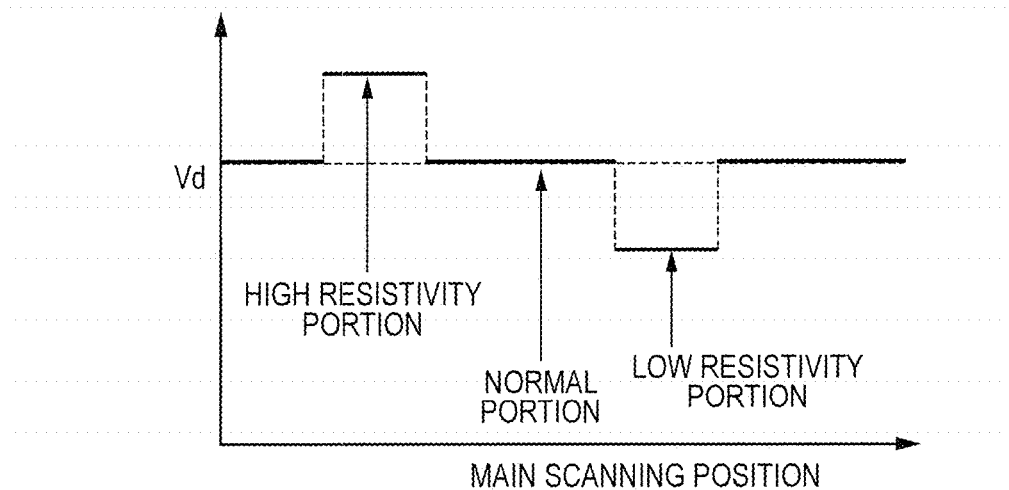
FIG. 10A and FIG. 10B are graphs used for describing a charge property of a contact charging system.
Figure 10B:
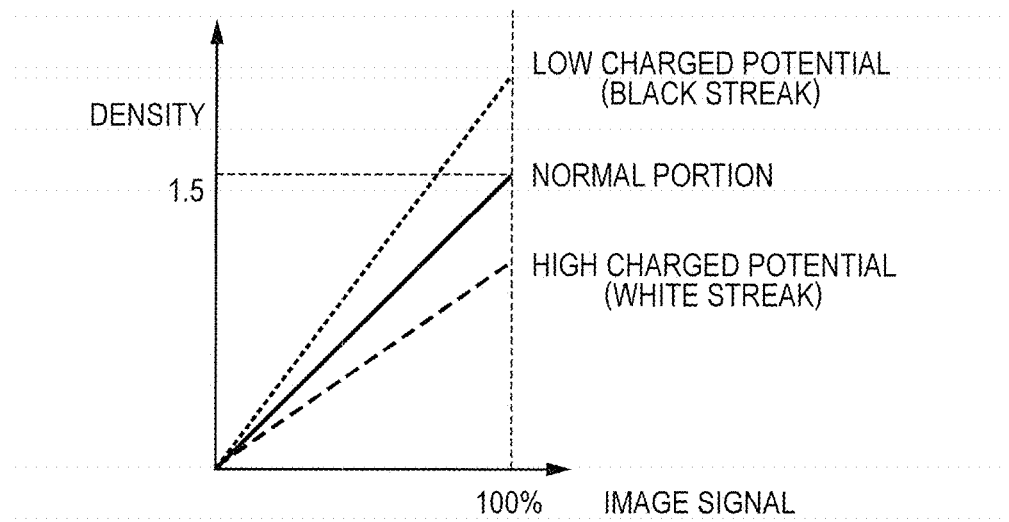

The charger 12 of the present embodiment employs a contact charging system, where charging is performed by bringing a charge member into contact with the photosensitive drum 11. In the charging in the contact charging system, an external additive such as Si may be adhered to the charger 12 at a certain position in the main-scanning direction, due to poor cleaning of the photosensitive drum 11. As a result, as illustrated in FIG. 10A, a resistance value of the charger 12 partially increases in the main-scanning direction, resulting in occurrence of a position having a higher charged potential. The position having the higher charged potential causes a density to be lowered relative to a normal portion with an identical image signal, as illustrated in FIG. 10B, resulting in occurrence of a white streak.

In addition, toner may be adhered to the charger 12 at a certain position in the main-scanning direction, due to poor cleaning of the photosensitive drum 11. The adhered toner causes the resistance value of the charger 12 to be lowered partially. While a resistance of the charger 12 gradually increases with duration, the resistance of the charger 12 partially decreases by exfoliation of an outer layer of the charger 12.

As a result, as illustrated in FIG. 10A, a resistance value of the charger 12 partially decreases in the main-scanning direction, resulting in a lower charged potential. The lower charged potential causes a density to be increased relative to a normal portion with an identical image signal, as illustrated in FIG. 10B, resulting in occurrence of a black streak. Of course, a unit to be exchanged by a user in order to eliminate the poor charging streak is a process cartridge of an occurring color.

A feature of the poor charging streak will be described.

First, the poor charging streak does not occur in a white background, where no image pattern is formed. An occurring color of the poor charging streak is limited only to a color of a charger where poor charging occurs.

Figure 11B:
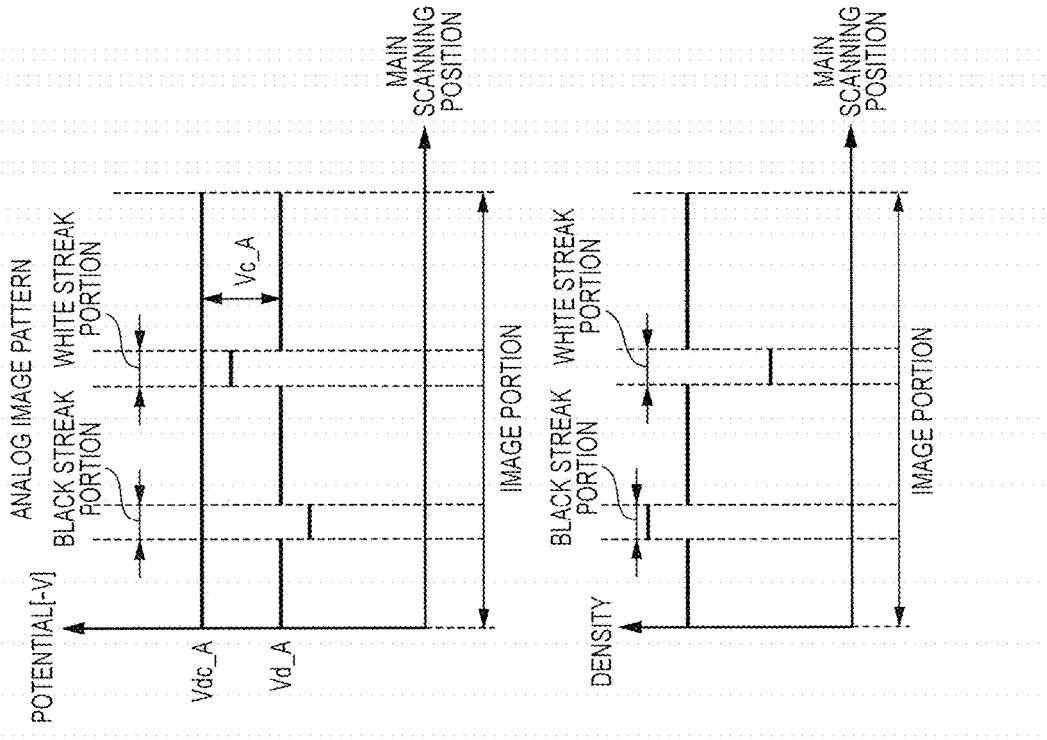
FIG. 11B is a graph illustrating a streak image property of an analog image pattern.
Figure 11A:
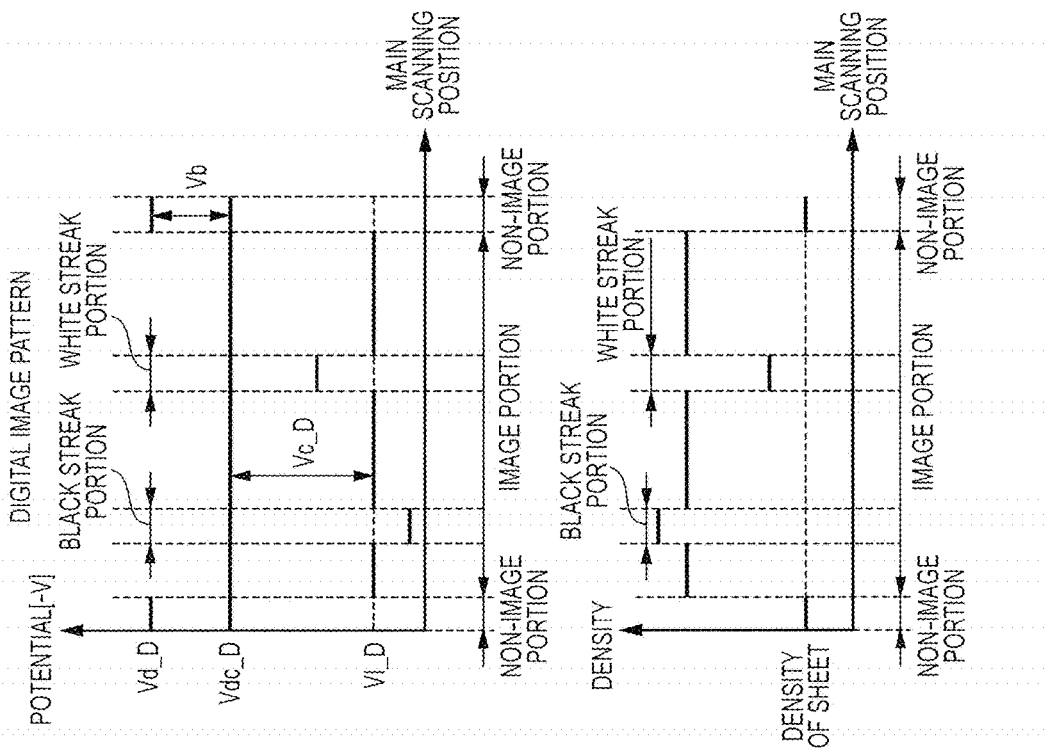
FIG. 11A is a graph illustrating a streak image property of a digital image pattern.

As illustrated in FIG. 11A and FIG. 11B, the poor charging streak occurs due to a partial unevenness of the charged potential.

In a case of a digital image pattern illustrated in FIG. 11A, a post-exposure potential (Vl_D) of the photosensitive drum 11 partially varies in some portions due to poor charging, and streaks occur in the portions. In a case of an analog image pattern illustrated in FIG. 11B, partial variations in the development voltage (Vc_A) influenced by the charged potential (Vd_A) cause a dark streak and a light streak.

[Transfer Belt Plastic Deformation Streak]

Next, description will be made about a transfer belt plastic deformation streak on the intermediate transfer belt 31, a fourth conveyance direction streak.

Due to a long-term use, shavings from an inner surface of the intermediate transfer belt 31 are in some cases attached to surfaces of rollers 36, 37, which are components forming a part of the transfer unit. In these cases, an attached portion of the intermediate transfer belt 31 suffers plastic deformation into a projecting shape, as a portion C illustrated in FIG. 12. The plastic deformation makes portions on both sides across the position suffering the plastic deformation difficult to come in contact with the photosensitive drum 11 and a recording material P. As a result, in the portions, a toner image is not subjected to secondary transfer onto the recording material P, causing white streaks.

In the projecting-shape portion, the toner image is subjected to the secondary transfer on the recording material P with more toner than other portions, causing a black streak.

Of course, a unit to be exchanged by a user in order to eliminate streaks by the plastic deformation of the intermediate transfer belt 31 is an intermediate transfer unit.

A feature of the transfer belt plastic deformation streak will be described.

First, the transfer belt plastic deformation streak does not occur in a white background, where no image pattern is formed. Since the transfer belt plastic deformation streak occurs in a secondary transfer portion, occurring colors of the transfer belt plastic deformation streak are all colors including yellow, magenta, cyan, and black. In addition, the transfer belt plastic deformation streak occurs irrespective of whether an image pattern is a digital image pattern or an analog image pattern.

Since the transfer belt plastic deformation streak is caused by a partial difference in transfer efficient in the secondary transfer portion, the transfer belt plastic deformation streak is a dark streak or a light streak.

[Black Streak Due to Poor Drum Cleaning]

Next, description will be made about a black streak due to poor drum cleaning, a fifth conveyance direction streak.

A black streak due to poor drum cleaning is caused by failing to scrape toner off from the photosensitive drum 11 after primary transfer because a portion of the drum cleaner 15 abutting against the photosensitive drum 11 is partially chipped.

The black streak due to poor drum cleaning occurs in a color of a station of a process cartridge 50. That is, when the poor drum cleaning occurs in a yellow station, a yellow streak occurs. Similarly, when the poor drum cleaning occurs in a black station, a black streak occurs. In addition, the black streak due to poor drum cleaning occurs in a form of a continuous black streak almost in a straight line on an image, particularly a white background. Of course, a unit to be exchanged in order to eliminate the poor drum cleaning is the process cartridge 50.

[Poor Drum Cleaning Streak]

Next, a feature of the poor drum cleaning streak will be described.

First, the streak occurs also in a white background, where an image pattern is not formed, since the poor drum cleaning streak is caused by poor cleaning. The streak is in a single color since the color of the streak in the white background is a color of toner accumulated on the drum cleaner 15 of the photosensitive drum 11. An occurring color of the poor drum cleaning streak can be all colors including yellow, magenta, cyan, and black since the poor drum cleaning streak also occurs in a color not involving in image formation. In addition, the poor drum cleaning streak occurs irrespective of whether an image pattern is a digital image pattern or an analog image pattern. The poor drum cleaning streak is a dark streak since the poor drum cleaning streak is a streak caused by toner attributable to poor cleaning.

[Black Streak Due to Poor Transfer Belt Cleaning]

Next, description will be made about a black streak due to poor transfer belt cleaning, a sixth conveyance direction streak. The black streak due to poor transfer belt cleaning is caused by failing to scrape toner off from the intermediate transfer belt 31 after secondary transfer because a portion of the transfer cleaner 35 abutting against the intermediate transfer belt 31 is partially chipped. The black streak due to poor transfer belt cleaning occurs in a color being mixture of yellow, magenta, cyan, and black toner. Of course, a unit to be exchanged in order to eliminate the poor transfer belt cleaning is the transfer cleaner 35.

A feature of the poor belt cleaning streak will be described.

First, the poor drum cleaning streak occurs also in a white background, where an image pattern is not formed, since the poor drum cleaning streak is caused by poor cleaning. The streak is in a mixture of colors of yellow, magenta, cyan, and black toner since the streak in the white background is in a color of toner accumulated on the transfer cleaner 35. In addition, the poor belt cleaning streak occurs irrespective of whether an image pattern is a digital image pattern or an analog image pattern. The poor drum cleaning streak is a dark streak since the poor drum cleaning streak is a streak caused by toner attributable to poor cleaning.

[Process for Determining Failure Part and Unit to be Exchanged]

Figure 13:
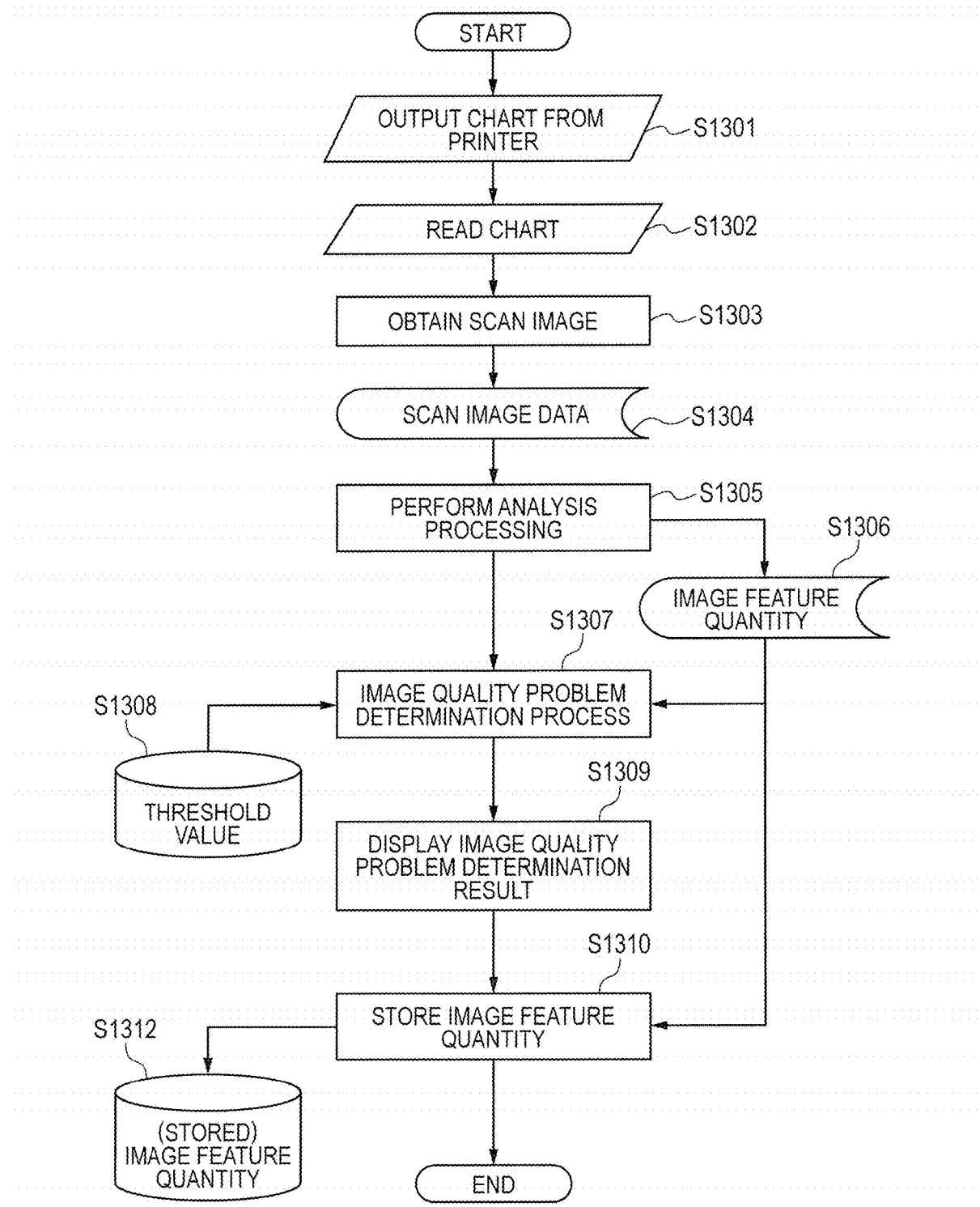
FIG. 13 is a flowchart used for describing a method for controlling the image forming apparatus.

FIG. 13 is a flowchart used for describing a method for controlling the image forming apparatus 1 according to the present embodiment. The present example is an example of a process for determining one of six types of vertical streaks shown in Table 1. A process corresponding to S1301 to S1310 is implemented by the CPU 103 in the controller 102 executing this process, and acquired data is saved in the storage device 121. The displaying device 118 displays instructions to a user on a UI screen, and the input device 120 receives instructions from a user or a serviceman. Image diagnosis processing is processing carried out by a user or a serviceman when an image quality problem occurs, and the image diagnosis processing is controlled by the image diagnosis portion 126.

First, a vertical streak detection chart to carry out an image diagnosis illustrated in FIG. 3 is output by a printer 115 (S1301), and the user or the serviceman acquires the vertical streak detection chart. Next, the user or the serviceman places the acquired vertical streak detection chart on the original glass plate 202 and closes a pressure plate.

The user or the serviceman then presses a scan start button to start reading the vertical streak detection chart with the scanner 119 (S1302). The CPU 103 acquires scan image data 1304 on the vertical streak detection chart from the scanner 119 (S1303). Next, the image diagnosis portion 126 performs analysis processing on the scan image data 1304 (S1305) to obtain an image feature quantity 1306. In the present embodiment, the image diagnosis portion 126 analyzes an occurring conveyance direction streak image from the scan image data 1304 read from the vertical streak detection chart.

Now, a method for analyzing the conveyance direction streak image will be described.

First, the CPU 103 causes the scanner 119 to read a vertical streak detection chart illustrated in FIG. 3 formed by uniform image patterns (printed with the printer). The scan image data 1304 output from the scanner 119 represents an RGB image. Therefore, the RGB image is divided into an R image, a G image, and a B image, which are individually analyzed and compared with each other, so that a color of a streak is determined.

Next, when analyzing a conveyance direction streak on the scan image data 1304 representing the R image, the G image, and the B image, the CPU 103 performs averaging processing on a plurality of pixels in the scan image data 1304, in a longitudinal direction (a recording material conveyance direction). Through the averaging processing, the CPU 103 mitigates an influence of electric noise in the scanner 119 on the scan image data 1304. In the present embodiment, pixels equivalent to 30 mm in the longitudinal direction, which is a width of a band image of each color, are averaged.

Next, the CPU 103 performs inclination correction processing for correcting inclination of luminance values along a breadth direction (a direction perpendicular to the longitudinal direction), on the scan image data 1304. Through the inclination correction processing, influences of the scanner 119 and unevenness in density in the image patterns are mitigated. The CPU 103 then converts luminance values of the scan image data 1304 into density data using a translation table or a transformation formula, so as to calculate a density profile with respect to positions in the main-scanning direction perpendicular to the conveyance direction of a recording material P.

FIG. 15A, FIG. 15B, FIG. 15C, FIG. 15D, FIG. 15E and FIG. 15F illustrate examples of density profiles for major streak images.

Figure 15A:
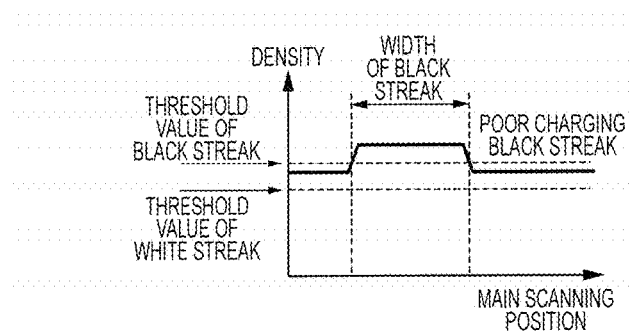
FIG. 15A, FIG. 15B, FIG. 15C, FIG. 15D, FIG. 15E, and FIG. 15F are graphs illustrating density profiles for representative streaks image.
Figure 15D:
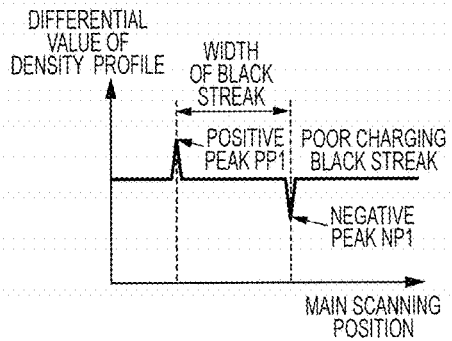
Figure 15B:
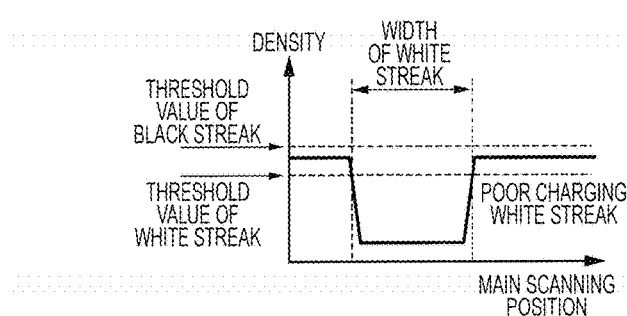
Figure 15E:
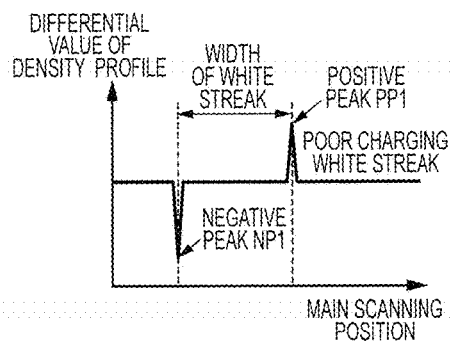
Figure 15C:
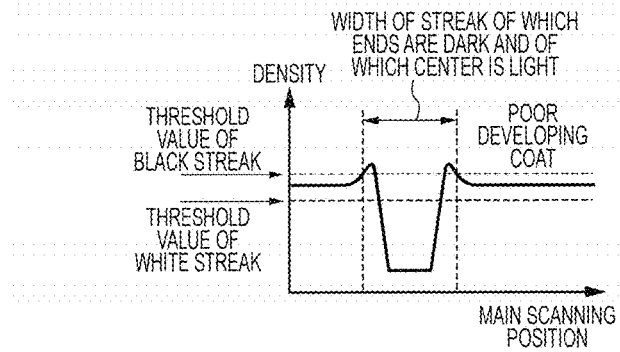

FIG. 15A illustrates an example of a poor charging black streak, FIG. 15B illustrates an example of a poor charging white streak, and FIG. 15C illustrates an example of a poor developing coat streak.

In the present embodiment, description is made about a method in which the luminance values are converted into concentration values before performing streak detection. However, the CPU 103 can use the luminance values to calculate the same feature quantity for a streak.

Next, an algorithm for detecting a streak portion from the density profile will be described.

To detect an area having a difference in detected density value from a uniform portion (normal portion) in an image pattern, the CPU 103 calculates a difference between an average density value and concentration values at positions, in the image pattern. When an area has a difference in density larger than a predetermined threshold value of black streak (a 5% difference in density from the average value in the present embodiment) (a luminance value of the area is low), the area is detected as a black streak. In contrast, when an area has a difference in density smaller than a predetermined threshold value of white streak (a 10% difference in density from the average value in the present embodiment) (a luminance value of the area is high), the area is detected as a white streak.

Next, description will be made about an algorithm for detecting the image feature quantity 1306 of a streak from the density profile, with reference to FIG. 15A, FIG. 15B and FIG. 15C.

In FIG. 15A, the CPU 103 detects a portion having a difference in density larger than the threshold value of black streak as a black streak. Here, the black streak is determined to have a width equal to a length of the portion having the difference in density larger than the threshold value of black streak. In FIG. 15B, the CPU 103 detects a portion having a difference in density smaller than the threshold value of white streak as a white streak. Here, the white streak is determined to have a width equal to a length of the portion having the difference in density smaller than the threshold value of white streak.

A poor developing coat streak illustrated in FIG. 15C has both ends having differences in density larger than the threshold value of black streak and has a central portion having a difference in density smaller than the threshold value of white streak.

In the present embodiment, when a distance between changeovers of a white streak and a black streak in a direction of the profile is 1 mm or smaller, the CPU 103 detects the distance as a streak of which ends are dark and of which center is light.

Here, a width of an area at both ends of which changeovers to the black streaks are made is determined as a width of a streak of which ends are dark and of which center is light.

A type of a streak, a position in the breadth direction where the streak occurs, a color of the streak (a single color or a mixture of colors), a difference in the detected density value from a uniform portion (a normal portion) (difference in the luminance value) obtained by the analyzing method described above are extracted as the image feature quantity 1306 of the streak. Here, types of streaks to extract include a white streak, a black streak, and a streak of which ends are dark and of which center is light.

The image feature quantity 1306 of a streak may be calculated from a result of differentiating the density profile rather than the density profile. Description will be made about an algorithm for calculating the image feature quantity 1306 of a streak from the result of differentiating the density profile.

Figure 15F:
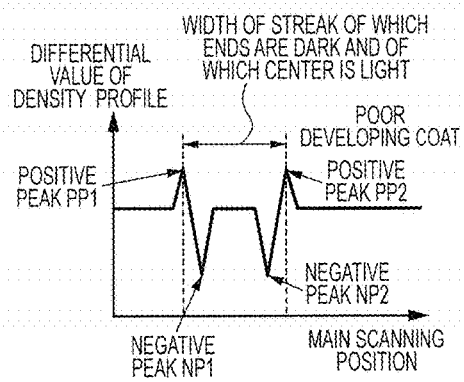

FIG. 15D, FIG. 15E and FIG. 15F illustrate derivative profile examples obtained by differentiating density profiles for major streak images.

FIG. 15D illustrates a derivative profile example of a poor charging black streak, FIG. 15E illustrates a derivative profile example of a poor charging white streak, and FIG. 15F illustrates a derivative profile example of a poor developing coat streak.

In a derivative profile of the poor charging black streak illustrated in FIG. 15D, a positive peak PP1 and a negative peak NP1 appear in this order, and a distance from the positive peak PP1 to the negative peak NP1 is determined as a width of the black streak.

In a derivative profile of the poor charging white streak illustrated in FIG. 15E, a negative peak NP1 and a positive peak PP1 appear in this order, and a distance from the negative peak NP1 to the positive peak PP1 is determined as a width of the white streak.

In a derivative profile of the poor developing coat streak illustrated in FIG. 15F, a positive peak PP1, a negative peak NP1, a negative peak NP2 and a positive peak PP2 appear in this order. Here, a distance from the positive peak PP1 to the positive peak PP2 is determined as a width of streak of which ends are dark and of which center is light.

In the present embodiment, when a distance between a changeover from the positive peak PP1 to the negative peak NP1 and a changeover from the negative peak NP2 to the positive peak PP2 in the profile direction is 1 mm or smaller, the distance is detected as a streak of which ends are dark and of which center is light.

As described above, a type of a streak (a white streak, a black streak, and a streak of which ends are dark and of which center is light) may be calculated based on an order of appearances of positive and negative peaks from a result of differentiating a density profile, and a width of the streak may be calculated based on a distance between the peak.

Although the description of the present embodiment is made about the example using derivative profiles, use may be made of difference profiles.

Here, the description is returned to the description of FIG. 13.

Next, the CPU 103 performs comparison with a predetermined threshold value 1308 for the image feature quantity 1306 and confirmation of presence/absence of a streak between image patterns, so as to perform an image quality problem determination process to determine a faulty spot and a unit to be exchanged (S1307). The image quality problem determination process will be described in detail.

Figure 16:
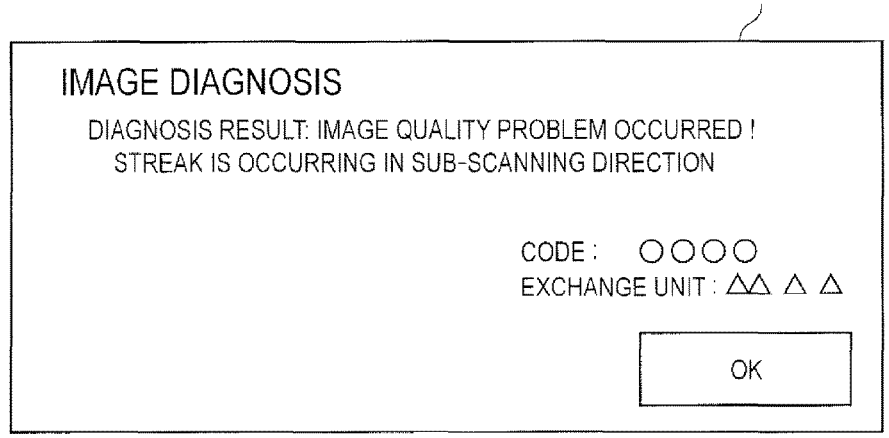
FIG. 16 is a diagram illustrating a UI screen displayed on a displaying device.

Next, the CPU 103 causes the displaying device 118 to display an image quality problem determination result (S1309). FIG. 16 illustrates an example of display on the displaying device 118.

FIG. 16 is a diagram illustrating a UI screen 401 displayed on the displaying device 118 illustrated in FIG. 2. The present example is an example of the UI screen 401 displaying a diagnosis result indicating a conveyance direction streak. On the UI screen 401, a message and coded information are displayed in combination to allow a user or a serviceman to understand the diagnosis result indicating the conveyance direction streak.

In contrast, when it is determined in S1307 that no conveyance direction streak has occurred, the CPU 103 causes the displaying device 108 to display a message indicating that the image forming apparatus has no problem, and other types of information (S1309). Specific information tells the occurrence of a conveyance direction streak and a detail of a unit to be exchanged. Therefore, a user and a serviceman can easily determine what unit should be exchanged.

Finally, in S1310, the CPU 103 saves the image feature quantity 1312 of the conveyance direction streak extracted by analyzing the image data of the vertical streak detection chart in the storage device 121, and terminates the processing.

FIG. 14 is a flowchart used for describing an image quality problem determination process in the first embodiment. The present example corresponds to a detailed procedure of the image quality problem determination process in S1307 illustrated in FIG. 13 for determining a unit being a cause of occurrence of a conveyance direction streak, which is a feature of the present embodiment. The CPU 103 performs the image quality problem determination process according to a control program stored in the storage device 121. A flow for determining a conveyance direction streak is to be performed for each main scanning position. In the present embodiment, the image quality problem determination process is performed every 5 mm position in the main-scanning direction. Intervals between positions in the main-scanning direction for the image quality problem determination process are not limited to the interval of the present embodiment. Therefore, a conveyance direction streak detected at another main scanning position can be determined to be due to another cause of occurrence. For that reason, even when faults in an image occur at a time due to a plurality of causes of occurrence, the plurality of causes of occurrence can be identified at a time.

First, the image diagnosis portion 126 causes the scanner 119 to read the vertical streak detection chart illustrated in FIG. 3 output from the printer in S1301, to start conveyance direction streak analysis (S1401).

Next, the image diagnosis portion 126 determines presence/absence of a streak in a white background (W) (S1402). Here, when determining that a streak is present in the white background (YES in S1402), the image diagnosis portion 126 advances the process to S1403. In S1403, the image diagnosis portion 126 determines whether a color of the streak read from the vertical streak detection chart by the scanner 119 is of a single color or a mixture of colors. Here, when determining that the streak is of a single color of yellow, magenta, cyan or black, the image diagnosis portion 126 advances the process to S1408.

In S1408, since the streak is of a single color of yellow, magenta, cyan or black, the image diagnosis portion 126 determines that a type of the conveyance streak is a poor drum cleaning streak, notifies the CPU 103 of the determination, and advances the process to S1414.

In S1414, the CPU 103 receives the notification from the image diagnosis portion 126, causes the displaying device 118 to display that a unit to be exchanged is the process cartridge 50 of the color, and terminates the process.

In contrast, when determining in S1403 that the streak is of a mixture of colors of yellow, magenta, cyan and black, the image diagnosis portion 126 advances the process to S1409. In S1409, the image diagnosis portion 126 determines that a type of the conveyance streak is a poor transfer belt cleaning streak, notifies the CPU 103 of the determination, and advances the process to S1415. In S1415, the CPU 103 receives the notification from the image diagnosis portion 126, causes the displaying device 118 to display that a unit to be exchanged is the transfer cleaner 35, and terminates the process.

In contrast, when determining in S1402 that no streak occurs in the white background (W) (NO in S1402), the image diagnosis portion 126 determines whether a streak occurs in any of digital image patterns of the respective colors (D-Y, D-M, D-C, D-Bk) (S1404). Here, when determining that no streak occurs in any of the digital image patterns of the respective colors (NO in S1404), the image diagnosis portion 126 notifies the CPU 103 of the determination, and advances the process to S1416. In S1416, the CPU 103 receives the notification from the image diagnosis portion 126, causes the displaying device 118 to display that no conveyance direction streak occurs, and terminates the process. In the six types of conveyance direction streaks shown in Table 1, there is no type where a streak occurs only in an analog image without occurring in a digital image.

In contrast, when determining in S1404 that a streak occurs in any of the digital image patterns of the respective colors (YES in S1404), the image diagnosis portion 126 advances the process to S1405.

In S1405, when the streak occurs in any of the digital image patterns of the respective colors, the image diagnosis portion 126 determines what specific color of yellow, magenta, cyan or black is a color of a digital image pattern where the streak occurs. Here, when determining that the streak occurs in every color (NO in S1405), the image diagnosis portion 126 determines that the streak is a transfer belt plastic deformation streak (S1410), notifies the CPU 103 of the determination, and advances the process to S1417. In S1417, the CPU 103 receives the notification from the image diagnosis portion 126, causes the displaying device 118 to display that a unit to be exchanged is the intermediate transfer unit (S1417), and terminates the process.

In contrast, when determining in S1405 that the streak occurs in a digital image pattern of a specific color (YES in S1405), the image diagnosis portion 126 advances the process to S1406. In S1406, the image diagnosis portion 126 determines whether another streak occurs in an analog image pattern of the same color as the digital image pattern where the streak of the specific color occurs. Here, when determining that the other streak does not occur in an analog image pattern (NO in S1406), the image diagnosis portion 126 determines that the streak is a poor exposure white streak of the occurring color, notifies the CPU 103 of the determination (S1411), and advances the process to S1418. In S1418, the CPU 103 receives the notification from the image diagnosis portion 126, causes the displaying device 118 to display that an exposure device of the occurring color should be cleaned or exchanged (S1418), and terminates the process.

In contrast, when determining in S1406 that the other streak occurs in the analog image pattern of the same color as the digital image pattern where the streak of the specific color occurs (YES in S1406), the image diagnosis portion 126 advances the process to S1407. Here, description will be made about conditions to be determined in S1407, with reference to FIG. 15A, FIG. 15B and FIG. 15C.

Description will be made in detail about the conditions used in S1407 by the image diagnosis portion 126 for isolation between poor charging and poor developing coat, with reference to FIG. 15A, FIG. 15B and FIG. 15C.

In the poor charging, only a dark streak occurs as illustrated in FIG. 15A, or only a light streak occurs as illustrated in FIG. 15B, at a main scanning position.

Meanwhile, in the poor developing coat streak, a streak of which ends are dark and of which center is light occurs at a main-scanning direction, as illustrated in FIG. 15C.

Thus, the image diagnosis portion 126 determines in S1407 whether a streak occurring in a digital image pattern is a streak of which ends are dark and of which center is light. Although the determination is made using a streak occurring in a digital image pattern in the present embodiment, the determination may be made using a streak occurring in an analog image pattern.

Here, when determining that the streak is a streak of which ends are dark and of which center is light (YES in S1407), the image diagnosis portion 126 advances the process to S1413. In S1413, the image diagnosis portion 126 determines that the streak is a poor developing coat streak of the occurring color, notifies the CPU 103 of the determination, and advances the process to S1420. In S1420, the CPU 103 receives the notification from the image diagnosis portion 126, causes the displaying device 118 to display that a unit to be exchanged is a developing device 14 of the occurring color, and terminates the process.

In contrast, when determining in S1407 that the streak is only a dark streak or a light streak (NO in S1407), the image diagnosis portion 126 determines that the streak is a poor charging streak, notifies the CPU 103 of the determination, and advances the process to S1412. In S1412, the CPU 103 receives the notification from the image diagnosis portion 126, causes the displaying device 118 to display that a unit to be exchanged is the process cartridge 50 including the charger 12 of the occurring color, and terminates the process.

As described above, a unit causing a conveyance direction streak can be determined based on the flows illustrated in FIG. 13 and FIG. 14, and a unit to be exchanged to alleviate the conveyance direction streak can be reliably identified.

In addition, displaying the unit to be exchanged on the displaying device 118 allows considerable reduction of a time taken for a user and a serviceman to identify a cause of the conveyance direction streak. Therefore, a downtime of the apparatus for maintenance can be considerably reduced.

Moreover, since a unit causing the conveyance direction streak can be reliably identified, a unit not causing the conveyance direction streak will not be exchanged, so that a useless maintenance cost will not occur.

Although the present embodiment has a configuration in which a result of analyzing a conveyance direction streak and a unit to be exchanged are displayed on the displaying unit to notify a user and a serviceman, the configuration does not limit the present invention.

For example, a method for notifying a serviceman over a network may be employed. In this case, the serviceman is allowed to know a component to be exchanged beforehand and can reliably carry the component to be exchanged for maintenance. In addition, although the description of the present embodiment is made about a color printer, the present embodiment is also applicable to a black and white printer.

The present embodiment is merely an example for describing the present invention, and the present invention is not limited to the present embodiment.

Specifically, the vertical streak detection chart is merely an example, and also when the order of the white background, the digital image patterns, and the analog image patterns in the conveyance direction is changed to other orders, the present embodiment can provide the same effects.

[Advantageous Effects of First Embodiment]

With the present embodiment, by outputting the vertical streak detection chart, the unit causing a conveyance direction streak image occurring in various portions of the image forming apparatus can be reliably identified.

Therefore, a downtime of the image forming apparatus can be reduced, and an increase in a maintenance cost due to exchanging a unit not to be exchanged can be prevented.

Specifically, in conventional practices, only outputting an analog image does not allow determination as to which of a charging unit and a developing unit a cause is attributable to. Hence, the cause is isolated between the charging unit and the developing unit by taking out the developing device and performing visual check to confirm whether a poor coat occurs in a sleeve portion.

With the present embodiment, a factor indicating how a poor developing coat streak is can be diagnosed and displayed using a feature of the poor developing coat streak, without need of taking out the developing device and performing visual check for the confirmation. As a result, the downtime for maintenance can be reduced by about 20 percent.

The first embodiment allows for making a diagnosis as to which of a charging unit and a developing unit causes a streak image by reading a sheet on which an image developed in absence of exposure is printed and a sheet on which an image developed in presence of exposure is printed.

Second Embodiment

Figure 17:
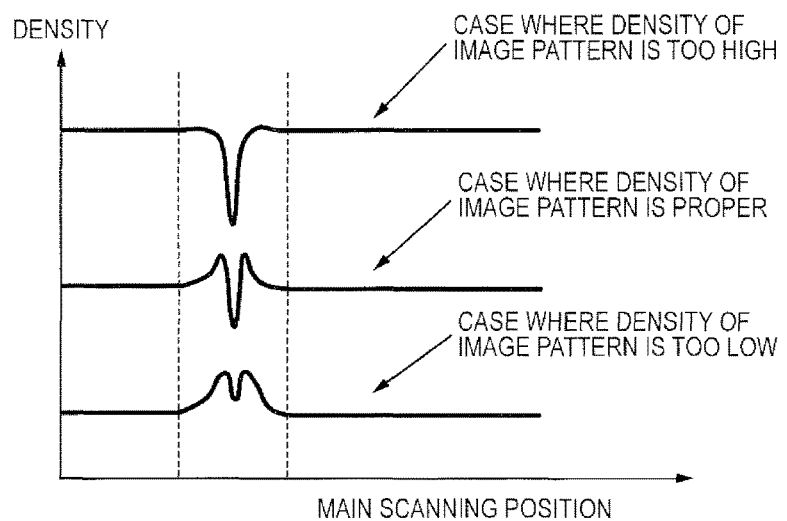
FIG. 17 is a graph illustrating a density property of an image pattern.

In the first embodiment, an image feature quantity of a streak is extracted using an image pattern at a density within one density region for each color. However, some reading device of a certain capability has a problem illustrated in FIG. 17 when the streak is due to a minor poor developing coat. In a case where a density of an image pattern is too high, ends of the streak having high densities cannot be detected as they are, and a center of the streak is detected as a light streak having a low density. In addition, in a case where a density of an image pattern is too low, the streak is detected as a streak having a high density.

Thus, in the present embodiment, use is made of a chart including a plurality of density regions so that the chart includes a density region that exerts an effect of reliably rendering a streak occurring due to poor developing coat a streak of which ends are light and of which center is dark. The chart allows reliable isolation between a poor developing coat streak and a poor charging streak even in a case of minor poor developing coat. Regards of the second embodiment are the same as the regards of the first embodiment except for the chart and part of the process for determining a failure Part and a unit to be exchanged, and the same regards will not be described.

[Second Poor Image Detection Chart]

A second poor image detection chart in the present embodiment is a chart including patterns of a plurality of density regions. In the present embodiment, description will be made about a second poor image detection chart including digital image patterns representing two density levels and analog image patterns representing one density level. However, combination of density levels is not limited to the above, and use may be made of analog image patterns for representing more density levels.

Figure 18:
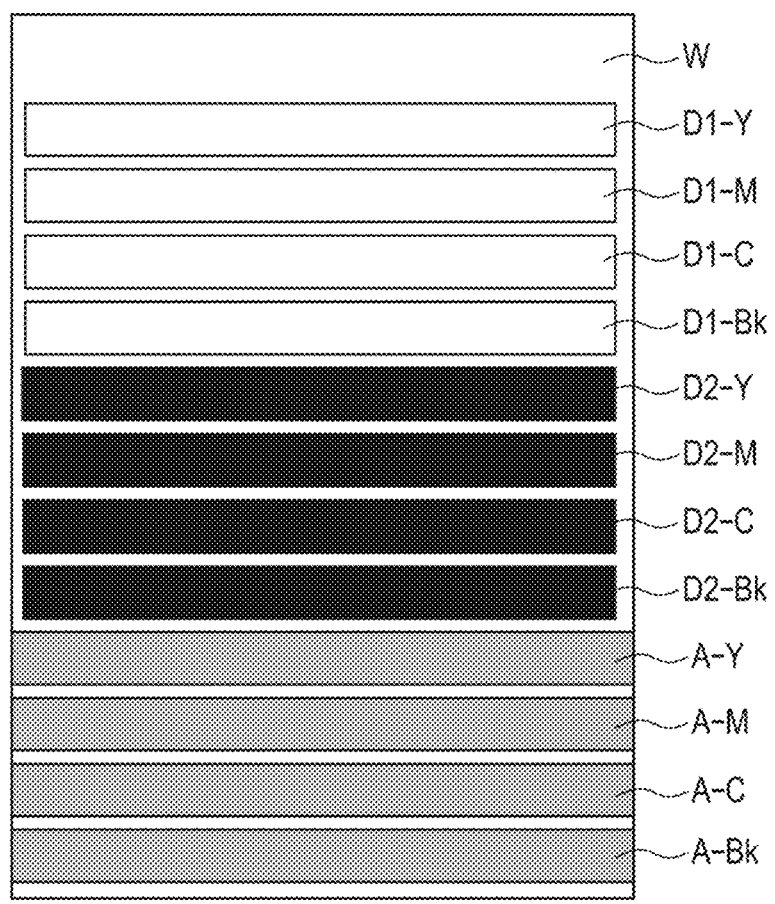
FIG. 18 is a diagram illustrating a second poor image detection chart.

FIG. 18 is a diagram illustrating the second poor image detection chart generated and printed by the image forming apparatus 1 representing the present embodiment (hereafter, referred to as a chart).

In FIG. 18, the chart includes a white background portion (W) where no image pattern is formed, and first digital image patterns (D1-Y, D1-M, D1-C and D1-Bk) are formed from 30% signal values of colors of yellow (Y), magenta (M), cyan (C) and black (Bk). The chart of the present embodiment further includes second digital image patterns (D2-Y, D2-M, D2-C, and D2-Bk) formed from 70% signal values of colors of yellow (Y), magenta (M), cyan (C) and black (Bk). The chart of the present embodiment further includes analog image patterns (A-Y, A-M, A-C and A-Bk) of yellow (Y), magenta (M), cyan (C) and black (Bk). In the present embodiment, a target density value for the 30% signal values of the colors of the respective digital image patterns is about 0.3, and a target density value for the 70% signal values of the respective colors is about 1.0. A target density value for the analog image patterns is about 0.6.

As to a size of the image patterns in the chart of the present embodiment, the image patterns are each set to have a length in the conveyance direction of about 30 mm, as in the first embodiment. The digital image patterns are each set to have a width in a main-scanning direction equal to an entire width of an image formable region, so that margins are formed. Meanwhile, the analog image patterns are each set to have a width in the main-scanning direction equal to an entire width of a sheet including ends of the sheet, so that margins are not formed.

[Process for Determining Failure Part and Unit to be Exchanged]

Figure 19:
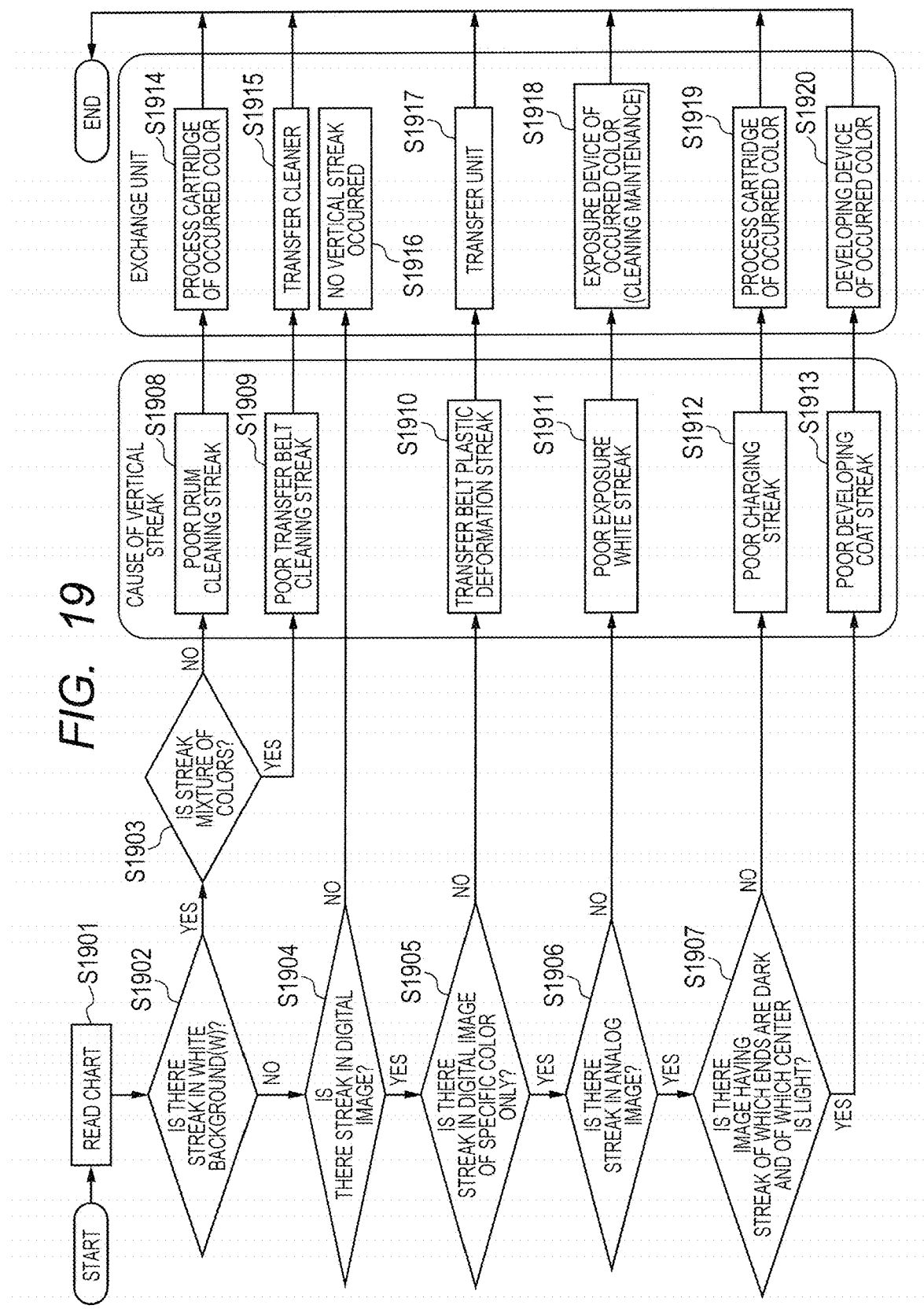
FIG. 19 is a flowchart used for describing an image quality problem determination process in a second embodiment.

A method for controlling the image forming apparatus 1 according to the present embodiment is the same as the method in the first embodiment described in FIG. 13, and will not be described. FIG. 19 is a flowchart used for describing an image quality problem determination process in the second embodiment. The CPU 103 performs the image quality problem determination process according to a control program stored in the storage device 121.

A difference in configuration between the present embodiment and the first embodiment lies only in S1907. Other steps, S1901 to S1906, S1908 to S1911, and S1914 to S1918 are the same as S1401 to S1406, S1408 to S1411, and S1414 to S1418, and will not be described.

As in the first embodiment, the image quality problem determination process illustrated in FIG. 19 is performed every 5 mm position in the main-scanning direction. Intervals between positions in the main-scanning direction for the image quality problem determination process are not limited to the interval of the present embodiment.

In S1907, the image diagnosis portion 126 determines whether a streak of which ends are dark and of which center is light occurs in an image pattern of any of the density regions. Here, when a streak of which ends are dark and of which center is light occurs in any of the image patterns (the first or second digital image patterns, or the analog image patterns) (YES in S1907), the image diagnosis portion 126 advances the process to S1913.

In S1913, the image diagnosis portion 126 determines that the streak is a poor developing coat streak of the occurring color, notifies the CPU 103 of the determination, and advances the process to S1920. In S1920, the CPU 103 receives the notification from the image diagnosis portion 126, causes the displaying device 118 to display that a unit to be exchanged is a developing device 14 of the occurring color, and terminates the process.

In contrast, when determining in S1907 that no streak of which ends are dark and of which center is light occurs in any of the image patterns (NO in S1907), the image diagnosis portion 126 advances the process to S1912. In S1912, the image diagnosis portion 126 determines that the streak is a poor charging streak, notifies the CPU 103 of the determination, and advances the process to S1919. In S1919, the CPU 103 receives the notification from the image diagnosis portion 126, causes the displaying device 118 to display that a unit to be exchanged is the process cartridge 50 including the charger 12 of the occurring color, and terminates the process.

[Advantageous Effects of Second Embodiment]

TABLE 2

| DEGREE OF POOR DEVELOPING COAT | IMAGE PATTERN DENSITY 0.3 | IMAGE PATTERN DENSITY 0.6 | IMAGE PATTERN DENSITY 1.0 | IMAGE PATTERN DENSITY 1.5 |
| --- | --- | --- | --- | --- |
| LOW | FAILED | FAILED | SUCCEEDED | FAILED |
| MIDDLE | FAILED | SUCCEEDED | SUCCEEDED | FAILED |
| LARGE | SUCCEEDED | SUCCEEDED | FAILED | FAILED |

Table 2 shows whether an image pattern of which density region allows detection of a feature of a streak of which ends are dark and of which center is light with various degrees of the poor developing coat. It can be understood that a density region allowing the feature detection of the streak differs depending on the degree of the poor developing coat.

The first embodiment cannot deal with minor poor developing coat disallowing detection of an image feature quantity of a poor developing coat streak due to an improper density of image patterns. However, with the second embodiment, using the density regions allowing reliable detection of an image feature quantity of a poor developing coat streak allows isolation between poor charging and poor developing coat.

The second embodiment allows for making a diagnosis as to which of a charging unit and a developing unit causes a streak image by reading a sheet on which an image developed in absence of exposure is printed and a sheet on which an image developed in presence of exposure is printed.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-027791, filed Feb. 17, 2017, which is hereby incorporated by reference herein in its entirety.

What is claimed is:

1. An image forming apparatus, comprising:
a photosensitive member;
a charging unit configured to charge the photosensitive member;
an exposure unit configured to expose the photosensitive member charged by the charging unit based on image data to form an electrostatic latent image on the photosensitive member;
a developing unit configured to develop the electrostatic latent image on the photosensitive member using developer to form an image;
a transfer unit configured to transfer the image on the photosensitive member onto a sheet; and
a controller configured to control the photosensitive member, the charging unit, the exposure unit, the developing unit, and the transfer unit to form a measurement image on the sheet, and acquire read data related to the measurement image output from a reading device,
wherein the measurement image includes a first measurement image and a second measurement image,
wherein the controller forms the first measurement image based on a first image signal value, and forms the second measurement image based on a second image signal value different from the first image signal value,
wherein the controller detects a streak included in the first measurement image or the second measurement image, and determines an error based on a detection result,
wherein when a density of an edge area of the streak is lower than a density of an area where the streak is not detected in the measurement image, the controller compares the density of the edge area of the streak with a density of another area different from the edge area of the streak, and
wherein when the density of the other area is higher than the density of the edge area, the controller detects the error of the developing unit.

2. The image forming apparatus according to claim 1, wherein the controller determines the error based on the density of the edge area of the streak and the density of the other area different from the edge area of the streak.

3. The image forming apparatus according to claim 1, wherein the controller selects the error of the developing unit or the charging unit based on a result of comparison between the density of the edge area of the streak and the density of the other area different from the edge area of the streak.

4. The image forming apparatus according to claim 1, wherein when the density of the other area is not higher than the density of the edge area, the controller detects the error of the charging unit.

5. The image forming apparatus according to claim 1, wherein the first image signal value is lower than a predetermined value, and
wherein the second image signal value is higher than the predetermined value.

6. The image forming apparatus according to claim 1, wherein the measurement image further includes a third measurement image, and
wherein the controller forms the third measurement image without using the exposure unit.

7. An information processing apparatus connectable to a printer in a communicatable manner, the printer including a photosensitive member, a charging unit configured to charge the photosensitive member, an exposure unit configured to expose the photosensitive member to form an electrostatic latent image, and a developing unit configured to develop the electrostatic latent image on the photosensitive member, the information processing apparatus comprising:
a controller configured to:
acquire read data related to a test chart printed by the printer, wherein the read data is outputted from a reading device;
determine whether a streak of a predetermined type has occurred in the test chart based on the read data; and detect an abnormality of the developing unit in a case in which it is determined that the streak of the predetermined type has occurred in the test chart, wherein the streak of the predetermined type includes a streak in which a density of an edge portion of the streak is higher than a density of a center portion of the streak.

8. The information processing apparatus according to claim 7, wherein the streak of the predetermined type includes a streak in which the density of the edge portion of the streak is higher than a density of an area other than the streak in the test chart and the density of the center portion of the streak is lower than the density of the area.

9. The information processing apparatus according to claim 7, wherein the developing unit includes a developing sleeve configured to carry developer, wherein the test chart includes a first test chart and a second test chart, wherein the printer causes the exposure unit to expose the photosensitive member while causing the charging unit to charge the photosensitive member so that a surface potential of the photosensitive member is lower than a surface potential of the developing sleeve, to form the first test chart, and wherein the printer causes the charging unit to charge the photosensitive member so that the surface potential of the photosensitive member is higher than the surface potential of the developing sleeve, to form the second test chart.

10. The information processing apparatus according to claim 9, wherein the controller detects an abnormality of the charging unit in a case in which the streak of the predetermined type has not occurred in both of the first test chart and the second test chart and a streak of another type different from the predetermined type has occurred in both of the first test chart and the second test chart.

11. A control method of a printer including a photosensitive member, a charging unit configured to charge the photosensitive member, an exposure unit configured to expose the photosensitive member to form an electrostatic latent image, and a developing unit configured to develop the electrostatic latent image on the photosensitive member, the method comprising:

printing a test chart, wherein the test chart is used for detecting a part of the printer causing a streak that occurs when the printer forms an image;

reading the test chart by a reading device;

detecting a streak of a predetermined type from the test chart based on a read result of the test chart; and determining the developing unit as the part causing the streak in a case in which the streak of the predetermined type is detected, wherein the streak of the predetermined type includes a streak in which a density of an edge portion of the streak is higher than a density of a center portion of the streak.

12. The control method according to claim 11, wherein the streak of the predetermined type includes a streak in which the density of the edge portion of the streak is higher than a density of an area other than the streak in the test chart and the density of the center portion of the streak is lower than the density of the area.

13. An information processing apparatus that detects an abnormality of a printer, the printer including a photosensitive member, a charging unit configured to charge the photosensitive member, an exposure unit configured to exposure the photosensitive member charged by the charging unit to form an electrostatic latent image, and a developing unit configured to develop the electrostatic latent image on the photosensitive member, the information processing apparatus comprising:

a controller configured to:

acquire read data related to a test chart printed by the printer, wherein the read data is outputted from a reading device;

determine whether a streak of a predetermined type occurs in the test chart based on the read data; and detect an abnormality of the developing unit in a case where the streak of the predetermined type occurs in the test chart, wherein the streak of the predetermined type is a streak extending in a conveyance direction in which the printer conveys a sheet, wherein a density of the streak of the predetermined type is lower than a reference density of an area in which no streak occurs in the test chart, and wherein a density of an area adjacent to the streak of the predetermined type is higher than the reference density.

14. The information processing apparatus according to claim 13, wherein the developing unit includes a developing sleeve and a regulating member, wherein the developing sleeve carries developer and rotates, and wherein the regulating member regulates an amount of the developer carried on the developing sleeve by rotating the developing sleeve.

15. The information processing apparatus according to claim 13, wherein the printer prints the test chart so that a density of the test chart is equal to a predetermined density.

16. The information processing apparatus according to claim 13, wherein the printer is a color printer, and wherein the test chart includes a plurality of test charts having different colors.

17. A detection method that detects an abnormality of a printer, the printer including a photosensitive member, a charging unit configured to charge the photosensitive member, an exposure unit configured to expose the photosensitive member to form an electrostatic latent image, and a developing unit configured to develop the electrostatic latent image on the photosensitive member, the method comprising:

printing a test chart, wherein the test chart is used for detecting a streak that occurs when the printer forms an image;

reading the test chart with a reading device;

detecting a streak of a predetermined type in the test chart based on a read result of the test chart; and detecting an abnormality of the developing unit in a case where the streak of the predetermined type is detected, wherein the streak of the predetermined type is a streak extending in a conveyance direction in which the printer conveys a sheet, wherein a density of the streak of the predetermined type is lower than a reference density of an area in which no streak occurs in the test chart, and wherein a density of an area adjacent to the streak of the predetermined type is higher than the reference density.

18. The detection method according to claim 17, wherein the developing unit includes a developing sleeve and a regulating member, wherein the developing sleeve carries developer and rotates, and wherein the regulating member regulates an amount of the developer carried on the developing sleeve by rotating the developing sleeve.

19. The detection method according to claim 17, wherein the printer prints the test chart so that a density of the test chart is equal to a predetermined density.

20. The detection method according to claim 17,
wherein the printer is a color printer, and
wherein the test chart includes a plurality of test charts having different colors.

* * * * *